(12) United States Patent
Nakajima

(10) Patent No.: US 11,256,454 B2
(45) Date of Patent: Feb. 22, 2022

(54) IMAGE FORMING APPARATUS CAPABLE OF SELECTIVELY PERFORMING LOGIN-TIME AUTOMATIC PRINTING, METHOD OF CONTROLLING SAME, AND STORAGE MEDIUM

(71) Applicant: CANON KABUSHIKI KAISHA, Tokyo (JP)

(72) Inventor: Satoru Nakajima, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/984,960

(22) Filed: Aug. 4, 2020

(65) Prior Publication Data

US 2020/0364012 A1 Nov. 19, 2020

Related U.S. Application Data

(63) Continuation of application No. 16/427,813, filed on May 31, 2019, now Pat. No. 10,768,874.

(30) Foreign Application Priority Data

Jun. 12, 2018 (JP) .............................. JP2018-112113

(51) Int. Cl.
*G06F 3/12* (2006.01)
*G06F 21/34* (2013.01)
*G06F 21/60* (2013.01)

(52) U.S. Cl.
CPC .......... *G06F 3/1238* (2013.01); *G06F 3/1222* (2013.01); *G06F 21/34* (2013.01); *G06F 21/608* (2013.01)

(58) Field of Classification Search
None
See application file for complete search history.

(56) References Cited

U.S. PATENT DOCUMENTS 8,908,203 B2 * 12/2014 Kakutani ............. G06F 3/1267
358/1.14
9,036,172 B2 * 5/2015 Kotsuji ................ G06F 3/1238
358/1.13
(Continued)

FOREIGN PATENT DOCUMENTS

JP 2009302811 A 12/2009

OTHER PUBLICATIONS

Office Action issued in U.S. Appl. No. 16/427,813 dated Dec. 11, 2019.
(Continued)

*Primary Examiner* — Henok Shiferaw
(74) *Attorney, Agent, or Firm* — Rossi, Kimms & McDowell LLP

(57) ABSTRACT

An image forming apparatus capable of preventing unintended print data from being automatically printed due to a user's erroneous operation in login-time automatic printing. The image forming apparatus includes a console panel that receives a user's operation. When a user logs in to the image forming apparatus by a first login method using credential information, automatic print processing is started based on print data stored in a storage area in association with the logged-in user, and the automatic print processing is not started when a user logs in to the image forming apparatus by a second login method which does not require credential information.

14 Claims, 24 Drawing Sheets

(56) References Cited

U.S. PATENT DOCUMENTS

| | | | |
|---|---|---|---|
| 9,075,550 B2* | 7/2015 | Kakutani | H04N 1/32128 |
| 10,489,097 B2* | 11/2019 | Nobutani | G06K 9/00288 |
| 10,768,874 B2* | 9/2020 | Nakajima | G06F 3/1238 |
| 11,093,181 B2* | 8/2021 | Lin | H04N 1/00411 |
| 2015/0002882 A1 | 1/2015 | Nakajima | |
| 2015/0205551 A1* | 7/2015 | Dohi | G06K 15/005 |
| | | | 358/1.15 |
| 2016/0004492 A1* | 1/2016 | Lin | G06F 3/1222 |
| | | | 358/1.13 |
| 2017/0075635 A1* | 3/2017 | Maemura | G06F 3/1285 |
| 2017/0257526 A1* | 9/2017 | Nakamura | H04N 1/00477 |
| 2017/0371601 A1* | 12/2017 | Kaneko | G06F 3/1238 |
| 2018/0081610 A1* | 3/2018 | Suzuki | G06F 3/1238 |

OTHER PUBLICATIONS

Notice of Allowance issued in U.S. Appl. No. 16/427,813 dated May 6, 2020.

* cited by examiner

FIG. 9

| USER NAME | DATE/TIME | IP ADDRESS | STORAGE LOCATION | PRINT JOB NAME | PRINT SETTINGS | JOB PASSWORD | AUTOMATIC PRINTING TARGET |
|---|---|---|---|---|---|---|---|
| USER A | 2016/4/10 10:34:45 | 192.168.2.11 | /data/0015/xxx | A1 | SINGLE-SIDED PRINTING, 1 COPY, MONOCHROME | NOT SET | ◯ |
| USER A | 2016/4/20 13:50:22 | 192.168.2.11 | /data/0591/yyy | A2 | DOUBLE-SIDED PRINTING, 3 COPIES, COLOR | NOT SET | ◯ |
| USER A | 2016/5/28 14:10:00 | 192.168.2.11 | /data/8125/zzz | A3 | DOUBLE-SIDED PRINTING, 5 COPIES, 2in1, COLOR | SET | — |
| USER B | 2016/4/11 10:34:45 | 192.168.2.11 | /data/0016/xxx | B1 | SINGLE-SIDED PRINTING, 1 COPY, MONOCHROME | SET | — |
| USER B | 2016/4/21 13:50:22 | 192.168.2.11 | /data/0592/yyy | B2 | DOUBLE-SIDED PRINTING, 3 COPIES, COLOR | NOT SET | ◯ |
| USER B | 2016/5/29 14:10:00 | 192.168.2.11 | /data/8126/zzz | B3 | DOUBLE-SIDED PRINTING, 5 COPIES, 2in1, COLOR | NOT SET | ◯ |

FIG. 18

| | LOGIN METHOD | | PIN CODE SETTING | LOGIN-TIME PRINTING |
|---|---|---|---|---|
| 1 | KEYBOARD LOGIN | | — | EXECUTABLE |
| 2 | SIMPLE LOGIN | "NECESSITY TO USE PIN CODE" SET TO ON | SET | EXECUTABLE |
| 3 | | "NECESSITY TO USE PIN CODE" SET TO OFF | SET | EXECUTABLE |
| 4 | | | NOT SET | INEXECUTABLE |
| 5 | LOGIN WITHOUT USER AUTHENTICATION | | — | INEXECUTABLE |

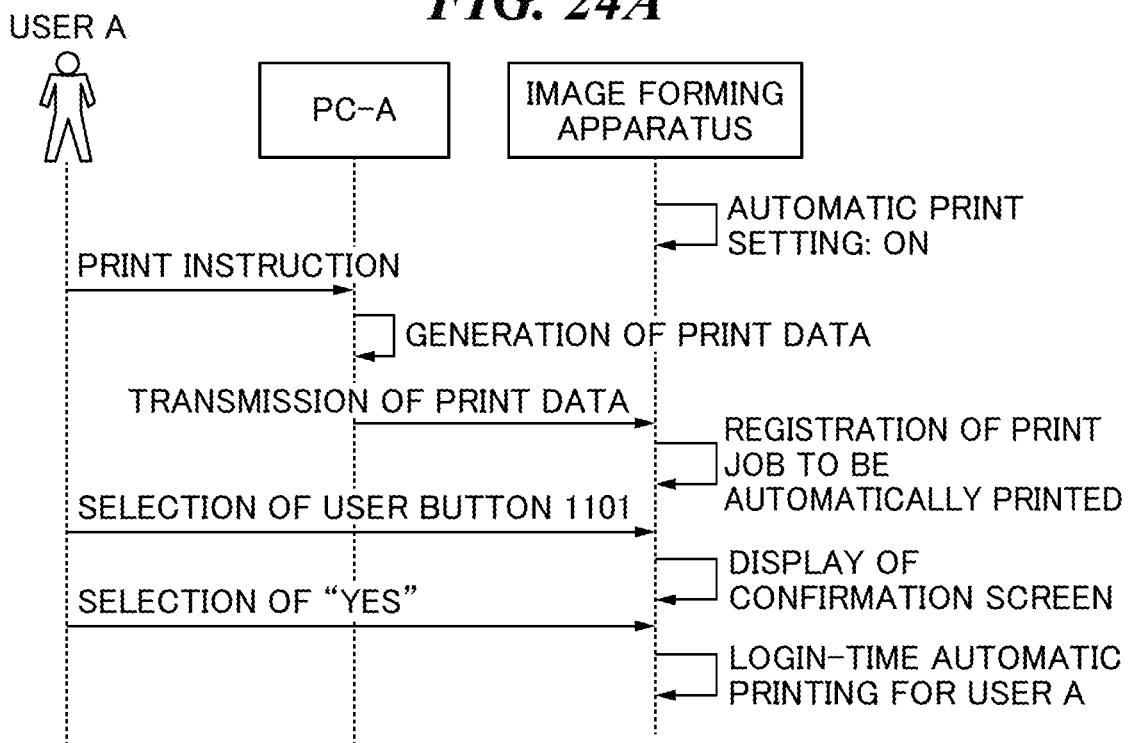
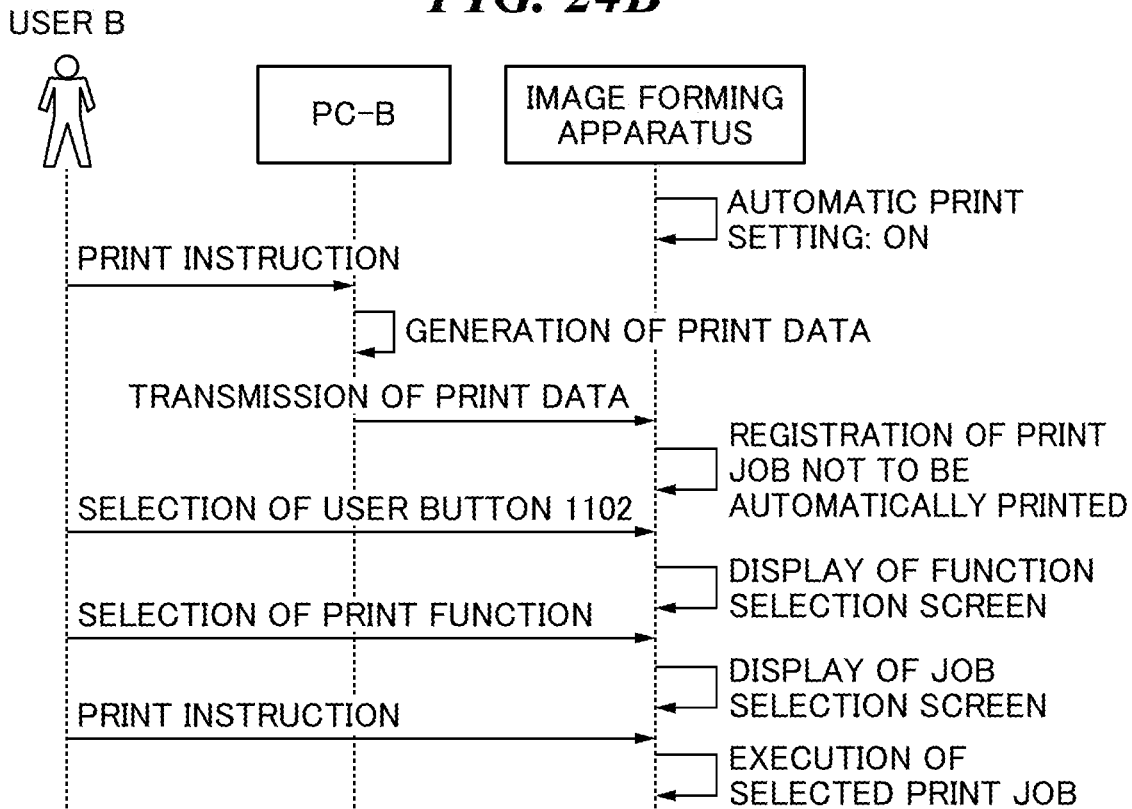

IMAGE FORMING APPARATUS CAPABLE OF SELECTIVELY PERFORMING LOGIN-TIME AUTOMATIC PRINTING, METHOD OF CONTROLLING SAME, AND STORAGE MEDIUM

BACKGROUND OF THE INVENTION

Field of the Invention

The present disclosure relates to an image forming apparatus that is capable of performing login-time automatic printing, a method of controlling the same, and a storage medium.

Description of the Related Art

Conventionally, an MFP is known which is an image forming apparatus equipped with a reservation printing function. When print data is acquired e.g. from a PC, this MFP does not immediately execute printing based on the acquired print data, but temporarily stores the acquired print data in an HDD of the MFP. After that, when a user logs in to the MFP, the MFP displays information of a list of print data associated with the logged-in user out of print data stored in the HDD. When an instruction for printing print data selected from the list of information by the user is received, the MFP starts printing of the selected print data.

Further, there has been developed an MFP equipped with a login-time automatic print function for starting, when a user logs in to the MFP, printing of print data associated with the user. In the MFP equipped with the login-time automatic print function, when a user logs in to the MFP, a job to be executed is determined using a feature of an authentication operation, such as an operation of touching an IC card for a certain time period or a plurality of times (see e.g. Japanese Laid-Open Patent Publication (Kokai) No. 2009-302811).

However, in the above-mentioned technique disclosed in Japanese Laid-Open Patent Publication (Kokai) No. 2009-302811, if one user erroneously performs an authentication operation using a feature associated with a job input by another user different from the one user, the job input by the other user is executed. That is, in the conventional technique, the login-time automatic printing has a problem that unintended print data is automatically printed due to a user's erroneous operation.

SUMMARY OF THE INVENTION

The present disclosure provides an image forming apparatus that is capable of preventing unintended print data from being automatically printed due to a user's erroneous operation in login-time automatic printing, a method of controlling the same, and a storage medium.

The present disclosure provides an image forming apparatus comprising a console panel that receives a user's operation, at least one memory that stores a set of instructions, and at least one processor that executes the instructions, the instructions, when executed, causing the image forming apparatus to perform operations comprising starting, in a case where a user has logged in to the image forming apparatus by a first login method using credential information, automatic print processing based on print data stored in a storage area in association with the user who has logged in, and not starting the automatic print processing in a case where a user has logged in to the image forming apparatus by a second login method which does not require credential information.

Further features of the present invention will become apparent from the following description of exemplary embodiments (with reference to the attached drawings).

BRIEF DESCRIPTION OF THE DRAWINGS

FIG. 9 is a diagram showing an example of a bibliographic information management table stored in an HDD appearing in FIG. 2.

FIG. 18 is a table showing executability of login-time automatic printing for each login pattern of the MFP appearing in FIG. 1.

FIGS. 24A and 24B are sequence diagrams showing a processing flow from reception of a print instruction at the PC to start of printing at the MFP in the case where the predetermined condition is satisfied.

DESCRIPTION OF THE EMBODIMENTS

The present invention will now be described in detail below with reference to the accompanying drawings showing embodiments thereof.

Figure 1:
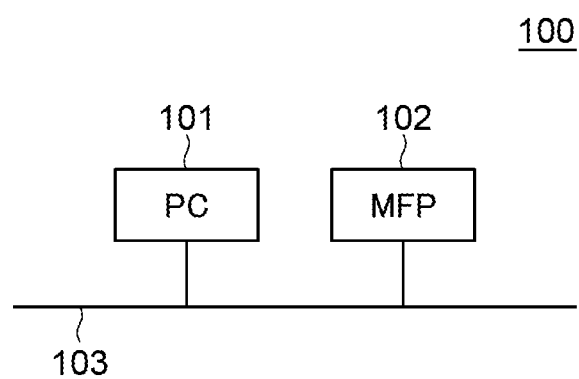
FIG. 1 is a schematic block diagram of a communication system including an MFP as an image forming apparatus according to an embodiment of the present disclosure.

FIG. 1 is a schematic block diagram of a communication system 100 including an MFP 102 as an image forming apparatus according to an embodiment of the present disclosure. Referring to FIG. 1, the communication system 100 includes a PC 101 and the MFP 102. Note that although in the present embodiment, the description is given of the communication system 100 including one PC 101 and one MFP 102 for ease of explanation, each of the respective number of PCs 101 and MFPs 102 provided in the communication system 100 is not limited to one. For example, the communication system 100 may be provided with at least one of the PC 101 and the MFP 102 in plurality. The PC 101 and the MFP 102 are connected to each other via a LAN 103. The PC 101 generates print data to be printed by the MFP 102. The print data is described in PDL (page description language), and includes actual data, such as an image and a document, bibliographic information, and so forth. The bibliographic information includes print settings for printing, such as the number of copies, information indicative of a user who has instructed transmission of the print data, and so forth. The PC 101 transmits the generated print data to the MFP 102.

The MFP 102 is equipped with a reservation printing function. When a setting of storing print data, which enables the reservation printing function, is made, the MFP 102 does not immediately perform printing of print data received e.g. from the PC 101, but temporarily stores (reserves) the received print data. The MFP 102 manages the reserved print data and bibliographic information included in the print data. When a user logs in to the MFP 102, information of a list of print data associated with the logged-in user out of the reserved print data is displayed on a console section 207 (console panel), referred to hereinafter with reference to FIG. 2. When an instruction for printing print data selected by the user using the list information is received, the MFP 102 starts printing of the selected print data.

Further, the MFP 102 is equipped with a login-time automatic print function. In a case where the login-time automatic print function is set enabled, when a predetermined login operation for logging in to the MFP 102 is received, the MFP 102 starts printing, out of the reserved print data, print data associated with the user having performed the login operation. By using the login-time automatic print function, the user can easily give an instruction for printing the reserved print data of the user without selecting print data to be printed by using the list information.

Figure 2:
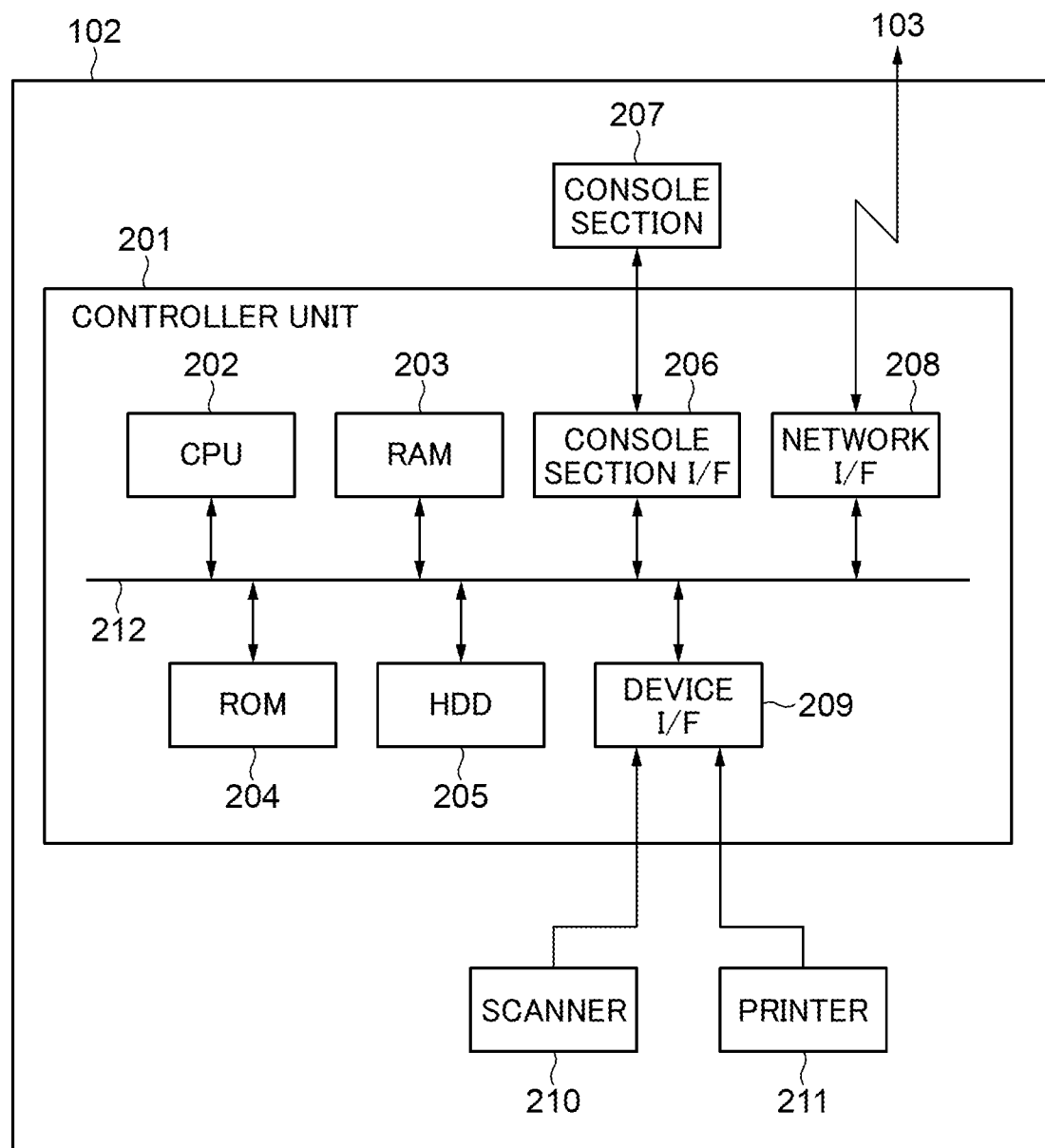
FIG. 2 is a schematic block diagram of hardware configuration of the MFP appearing in FIG. 1.

FIG. 2 is a schematic block diagram of hardware configuration of the MFP 102 appearing in FIG. 1. Referring to FIG. 2, the MFP 102 includes a controller unit 201, the console section 207, a scanner 210, and a printer 211. The controller unit 201 is connected to the console section 207, the scanner 210, and the printer 211. Further, the controller unit 201 includes a CPU 202, a RAM 203, a ROM 204, an HDD 205, a console section interface 206, a network interface 208, and a device interface 209. The CPU 202, the RAM 203, the ROM 204, the HDD 205, the console section interface 206, the network interface 208, and the device interface 209 are interconnected via a system bus 212.

The controller unit 201 controls the MFP 102 in a centralized manner. The CPU 202 controls a system software module group 301, described hereinafter with reference to FIG. 3. The RAM 203 is a system work memory for operation of the CPU 202 and is also used as an image memory for temporarily storing image data. The RAM 203 stores programs, such as an operating system, the system software module group 301, and application software, and various data. The ROM 204 stores a boot program of the system, etc. The HDD 205 stores the operating system, the system software module group 301, the application software, image data, setting data, and so forth. The console section interface 206 connects between the console section 207 and the controller unit 201. The console section interface 206 outputs data to the console section 207 for display thereon. Further, the console section interface 206 acquires information input by a user via the console section 207. The console section 207 includes a touch panel-type display section and a plurality of hardware keys. The network interface 208 performs data communication with an external apparatus connected thereto via the LAN 103, such as the PC 101. The device interface 209 connects between the scanner 210 and the printer 211, which are image input and output devices, and the controller unit 201. The device interface 209 controls communication of image data between the image input and output devices and the controller unit 201. The scanner 210 reads an original set thereon and generates image data. The generated image data is stored in the HDD 205. The printer 211 performs printing on a sheet based on print data acquired from the PC 101 or the like.

Figure 3:
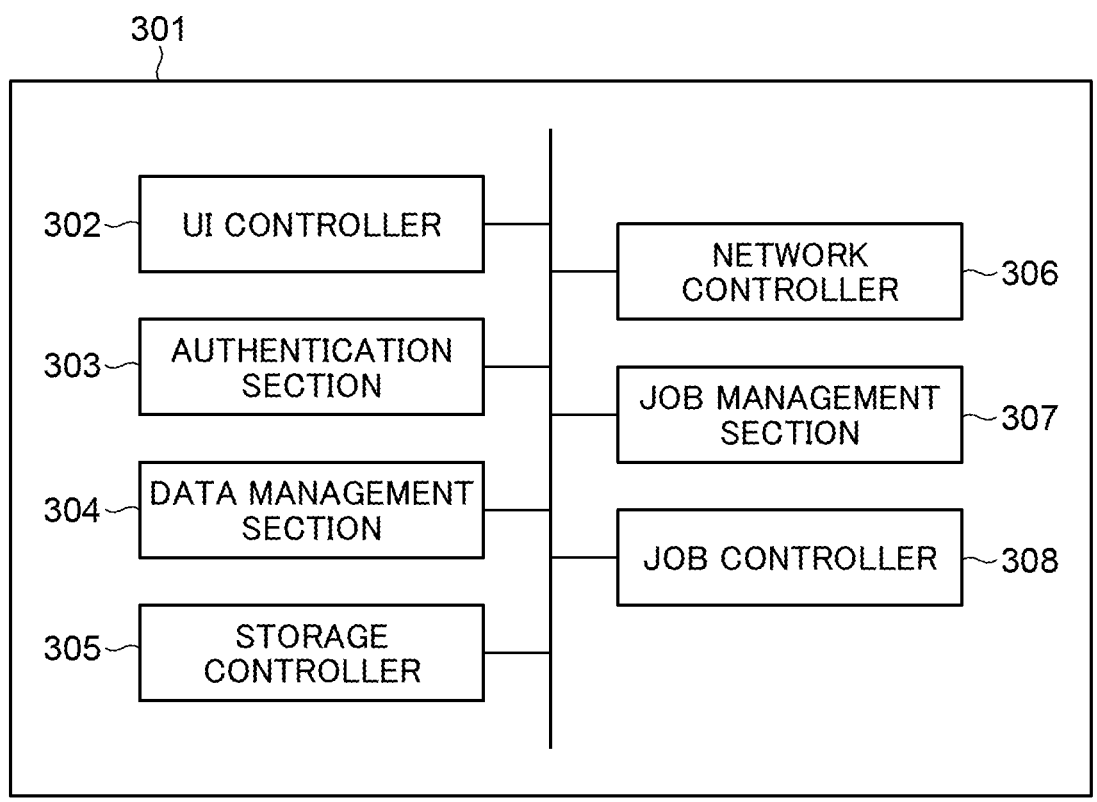
FIG. 3 is a schematic block diagram of a system software module group installed in the MFP appearing in FIG. 1.

FIG. 3 is a schematic block diagram of the system software module group 301 installed in the MFP 102 appearing in FIG. 1. Referring to FIG. 3, the system software module group 301 includes a UI controller 302 (display control unit), an authentication section 303, a data management section 304, a storage controller 305, a network controller 306, a job management section 307, and a job controller 308, as modules. The modules of the system software module group 301 are stored in any of the RAM 203, the ROM 204, and the HDD 205, and are executed by the CPU 202.

The UI controller 302 acquires information input by the user via the console section 207 from the console section interface 206, and outputs the acquired information to the authentication section 303, the data management section 304, and the job management section 307. Further, when information as a response is received from any of the authentication section 303, the data management section 304, and the job management section 307, the UI controller 302 outputs the acquired information to the console section 207 via the console section interface 206. The authentication section 303 acquires user information, such as a user name and a login password, input via the console section 207 from the UI controller 302, and performs authentication processing based on the acquired user information. The authentication section 303 outputs a result of the authentication processing to the UI controller 302. When a data access request is received from any of the UI controller 302, the network controller 306, and the job management section 307, the data management section 304 outputs a data writing request or a data reading request to the storage controller 305. Further, when information as a response is acquired from the storage controller 305, the data management section 304 outputs the acquired information to the UI controller 302, the network controller 306, and the job management section 307.

When a data writing request (or a data reading request) is received from the data management section 304, the storage controller 305 writes (or reads out) data into (or from) the HDD 205 and outputs the result to the data management section 304. The network controller 306 controls data communication with an external apparatus connected to the MFP 102 via the LAN 103. For example, the network controller 306 requests the data management section 304 or the job management section 307 to execute processing according to a request received from the PC 101. Further, when a response is received from the data management section 304 or the job management section 307, the network controller 306 transmits the received response to the PC 101 via the network interface 208.

The job management section 307 manages a job corresponding to an execution request received from the UI controller 302 or the network controller 306. For example, the job management section 307 outputs a request for executing a job to the job controller 308, and further, outputs a data writing request or a data reading request to the data management section 304. On the other hand, when a response is received from the data management section 304 or the job controller 308, the job management section 307 outputs a state of the job to the UI controller 302 or the network controller 306. When the job execution request is received from the job management section 307, the job controller 308 controls the operations of the scanner 210 and the printer 211 so as to execute the job. Further, the job controller 308 receives information on the operating states of the scanner 210 and the printer 211 via the device interface 209, and transmits the received information to the job management section 307.

Figure 4:
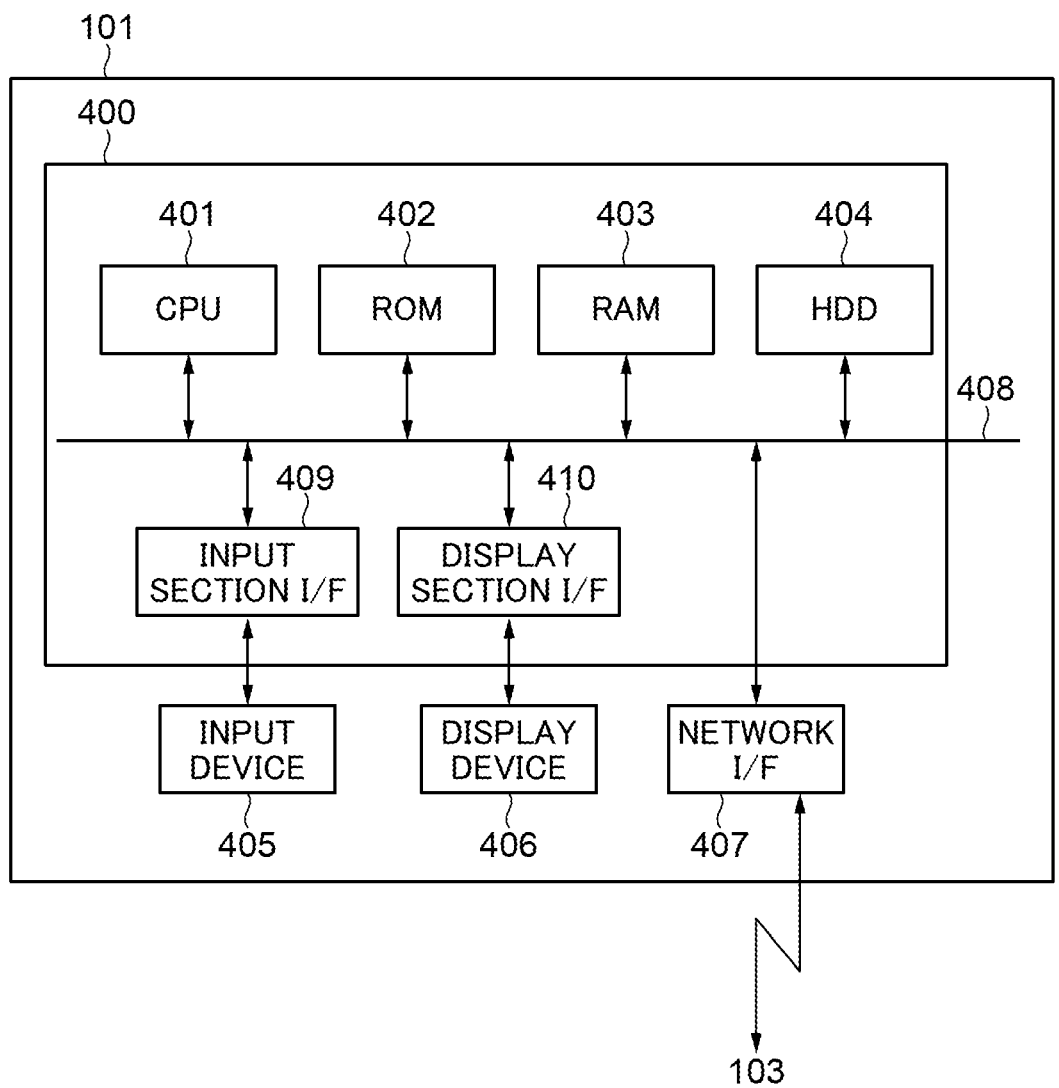
FIG. 4 is a schematic block diagram of hardware configuration of a PC appearing in FIG. 1.

FIG. 4 is a schematic block diagram of hardware configuration of the PC 101 appearing in FIG. 1. Referring to FIG. 4, the PC 101 includes a controller 400, an input device 405, a display device 406, and a network interface 407. The controller 400 is connected to the input device 405, the display device 406, and the network interface 407. Further, the controller 400 includes a CPU 401, a ROM 402, a RAM 403, an HDD 404, an input section interface 409, and a display section interface 410. The CPU 401, the ROM 402, the RAM 403, the HDD 404, the input section interface 409, and the display device interface 410 are interconnected via a system bus 408.

The CPU 401 controls the overall system of the PC 101. For example, the CPU 401 controls a system software module group 501, described hereinafter with reference to FIG. 5. The ROM 402 stores programs and data associated with processes. The RAM 403 is a system work memory for operation of the CPU 401. Further, the RAM 403 is used as a storage memory for temporarily storing data associated with each process. The HDD 404 stores application data, and further stores programs and data associated with processes. The input section interface 409 is an interface for connecting between the controller 400 and the input device 405. The input device 405 is comprised of a keyboard, a pointing device, and the like, which receive user's instructions to the PC 101. The display section interface 410 is an interface for connecting between the controller 400 and the display device 406. The display device 406 displays an operating state of the PC 101 and information output by each program operating on the PC 101. The network interface 407 performs data communication with an external apparatus connected thereto via the LAN 103, such as the MFP 102.

Figure 5:
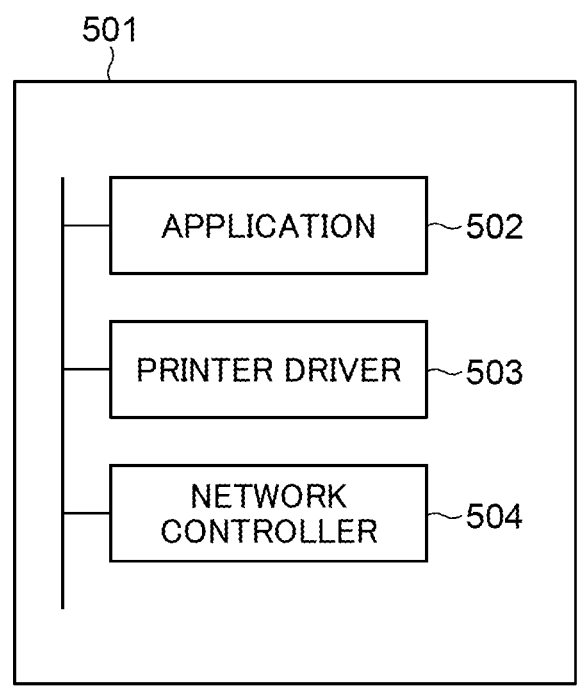
FIG. 5 is a schematic block diagram of a system software module group installed in the PC appearing in FIG. 1.

FIG. 5 is a schematic block diagram of the system software module group 501 installed in the PC 101 appearing in FIG. 1. Referring to FIG. 5, the system software module group 501 includes an application 502, a printer driver 503, and a network controller 504, as modules. The modules of the system software module group 501 are stored in any of the ROM 402, the RAM 403, and the HDD 404, and are executed by the CPU 401. The application 502 generates image data and document data e.g. based on information input by the user using the input device 405. The printer driver 503 generates print data. The network controller 504 transmits the generated print data e.g. to the MFP 102.

Figure 6:
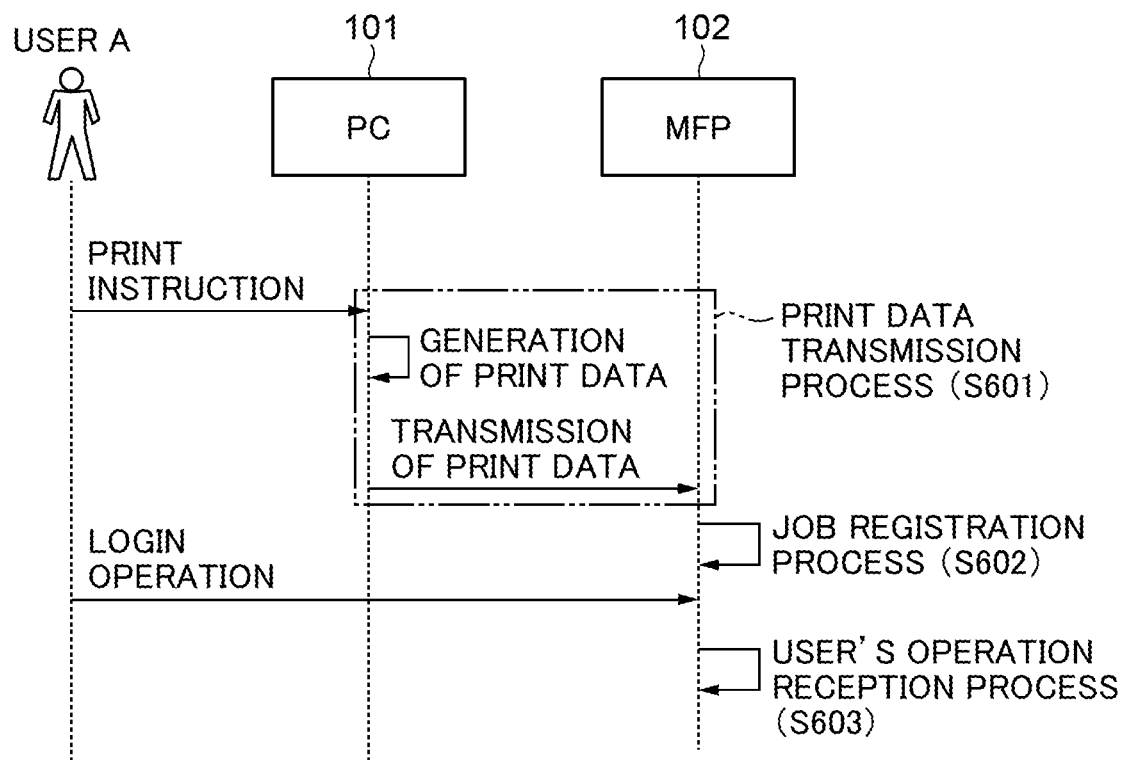
FIG. 6 is a sequence diagram showing a processing flow from reception of a print instruction at the PC, appearing in FIG. 1, to execution of login-time automatic printing by the MFP.

FIG. 6 is a sequence diagram showing a processing flow from reception of a print instruction at the PC 101 to execution of login-time automatic printing at the MFP 102.

Referring to FIG. 6, upon receipt of a print instruction from a user A, the PC 101 performs a print data transmission process, described hereinafter with reference to FIG. 7 (step S601) to transmit generated print data to the MFP 102. The MFP 102 having received the print data performs a job registration process, described hereinafter with reference to FIG. 8 (step S602) to register bibliographic information included in the received print data. After that, upon receipt of a login operation performed by the user A, the MFP 102 performs a user's operation reception process, described hereinafter with reference to FIG. 16 (step S603), followed by terminating the present process.

Figure 7:
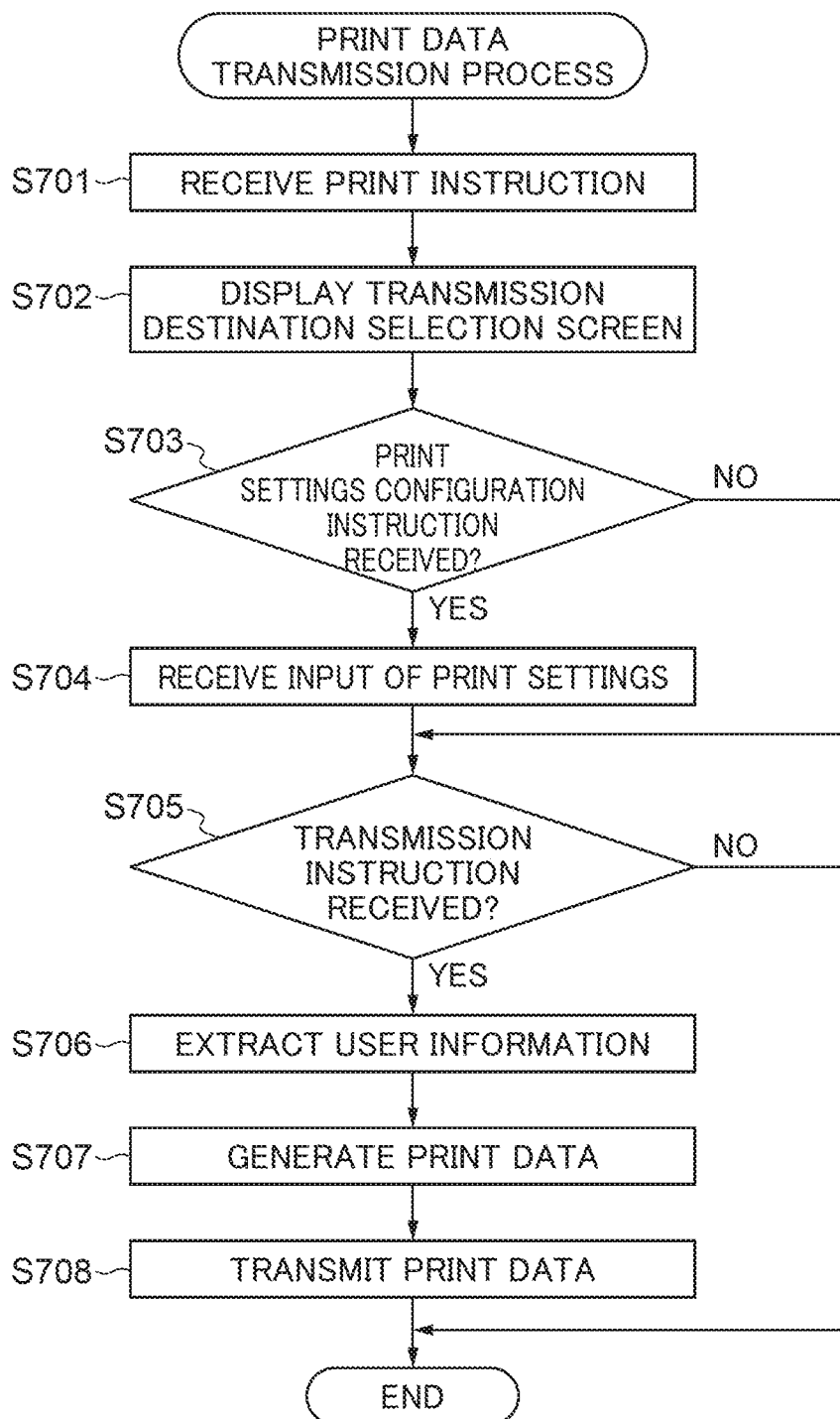
FIG. 7 is a flowchart of a print data transmission process performed in a step in FIG. 6.

FIG. 7 is a flowchart of the print data transmission process performed in the step S601 in FIG. 6. The process in FIG. 7 is performed by the CPU 401 of the PC 101 that executes associated programs stored in the ROM 402 and the HDD 404.

Referring to FIG. 7, upon receipt of a print instruction input by the user A (step S701), the CPU 401 displays a transmission destination selection screen (not shown) for prompting the user A to select a transmission destination of print data, on the display device 406 (step S702). Then, for example, when the MFP 102 is selected on the transmission destination selection screen, the CPU 401 determines whether or not an instruction for configuring print settings (hereinafter referred to as the "print settings configuration instruction") has been received from the user A (step S703).

If it is determined in the step S703 that no print settings configuration instruction has been received, the CPU 401 proceeds to a step S705, referred to hereinafter. If it is determined in the step S703 that a print settings configuration instruction has been received, the CPU 401 displays a print settings screen (not shown) of the printer driver 503 associated with the MFP 102 selected as the transmission destination of print data on the display device 406. Then, after receiving inputs of the print settings on the print settings screen (step S704), the CPU 401 determines whether or not a print data transmission instruction has been received (step S705).

If it is determined in the step S705 that no print data transmission instruction has been received, the CPU 401 terminates the present process. If it is determined in the step S705 that a print data transmission instruction has been received, the CPU 401 extracts user information of the user A (step S706). Then, the CPU 401 causes the printer driver 503 to generate print data based on the print settings input on the print settings screen (step S707). Then, the CPU 401 transmits the generated print data to the MFP 102 (step S708), followed by terminating the present process.

Figure 8:
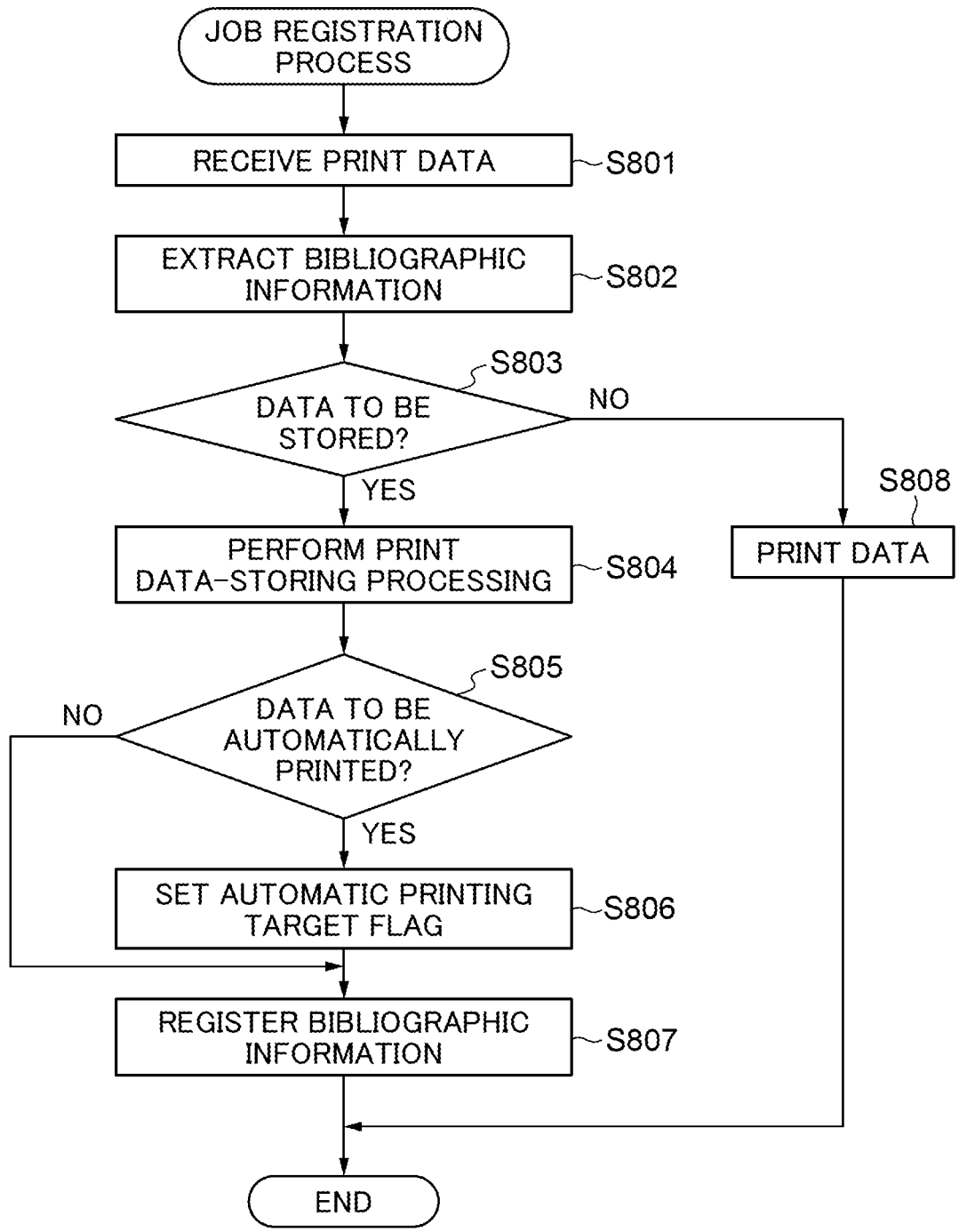
FIG. 8 is a flowchart of a job registration process performed in a step in FIG. 6.

FIG. 8 is a flowchart of the job registration process performed in the step S602 in FIG. 6. The process in FIG. 8 is performed by the CPU 202 of the MFP 102 that executes associated programs stored in the ROM 204 and the HDD 205.

Referring to FIG. 8, upon receipt of the print data generated based on the print instruction input by the user A from the PC 101 (step S801), the CPU 202 extracts bibliographic information from the received print data (step S802). Then, the CPU 202 determines whether or not the received print data is data to be stored (step S803). The data to be stored refers to e.g. print data having information added thereto, such as a print data name, a user name, and identification information of the PC 101 having generated the print data, which satisfies predetermined conditions.

If it is determined in the step S803 that the print data is data to be stored, the CPU 202 causes the storage controller 305 to perform print data-storing processing for storing the print data in the HDD 205 (step S804). Then, the CPU 202 determines whether or not the print data is data to be automatically printed (execution target of automatic printing start processing) (step S805). In the step S805, for example, in a case where the print data is print data with a password, or in a case where the print data is print data which has been printed once, the CPU 202 determines that the print data is not data to be automatically printed. On the other hand, if neither of the above-mentioned conditions are satisfied, the CPU 202 determines that the print data is data to be automatically printed.

If it is determined in the step S805 that the print data is not data to be automatically printed, the CPU 202 proceeds to a step S807. If it is determined in the step S805 that the print data is data to be automatically printed, the CPU 202 sets an automatic printing target flag indicating that the print data is data to be automatically printed, for the print data (step S806). Then, the CPU 202 causes the storage controller 305 to register the extracted bibliographic information in a bibliographic information management table 900 shown in FIG. 9 (step S807). In the MFP 102, a plurality of bibliographic information items associated with respective users who use the MFP 102 are managed in the bibliographic information management table 900. The bibliographic information management table 900 is stored in the HDD 205. The bibliographic information management table 900 has the items of user name 901, date/time 902, IP address 903, storage location 904, print job name 905, print settings 906, job password 907, and automatic printing target 908. As the user name 901, a user name of print data of a registered bibliographic information item is set. As the date/time 902, a date and time at which the MFP 102 received the print data of the registered bibliographic information item is set. As the IP address 903, an IP address of the MFP 102 is set. As the storage location 904, a location where the print data of the registered bibliographic information item is stored is set. As the print job name 905, the name of a print job for printing the print data associated with the registered bibliographic information item is set. As the print settings 906, print settings in the registered bibliographic information item are set. As the job password 907, information indicative of whether or not a password is set for the print data associated with the registered bibliographic information item is set. As the automatic printing target 908, a mark "o" is set which indicates that the print data of the registered bibliographic information item is print data for which the automatic printing target flag is set in the step S806, i.e. print data to be automatically printed. Then, the CPU 202 terminates the present process.

If it is determined in the step S803 that the print data is not data to be stored, the CPU 202 prints the received print data (step S808), followed by terminating the present process.

Figure 10:
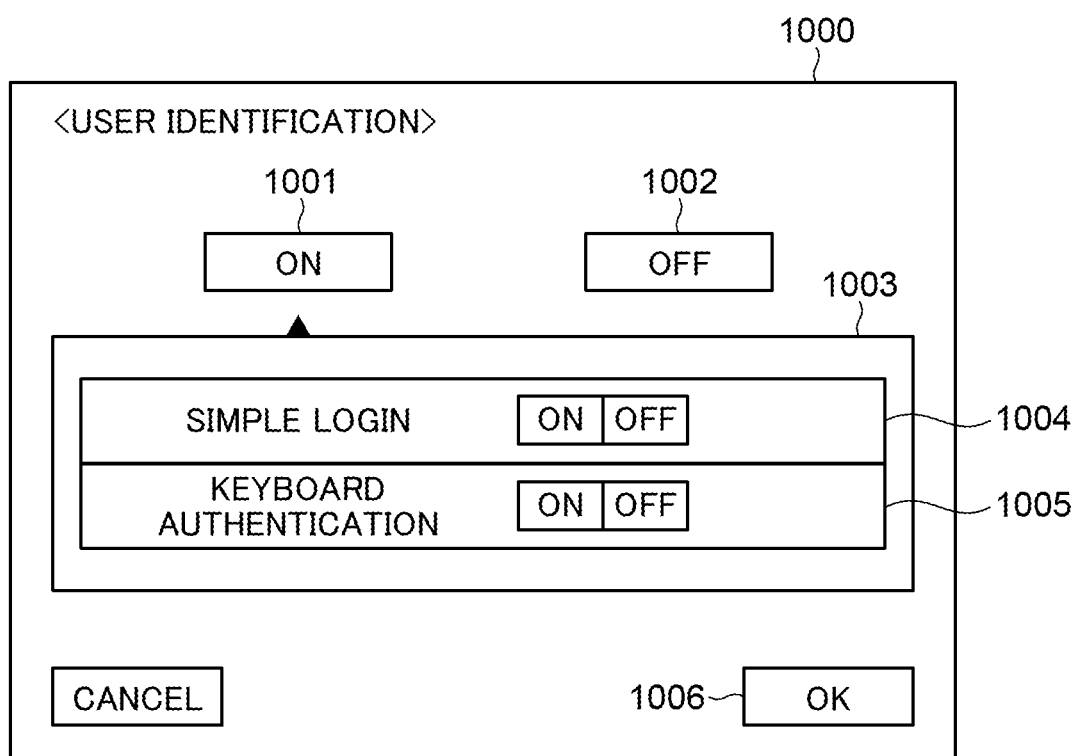
FIG. 10 is a diagram showing an example of a setting screen displayed on a console section appearing in FIG. 2.

Incidentally, in the MFP 102, whether or not to execute login processing for identifying a user is set on a setting screen 1000 shown in FIG. 10. The setting screen 1000 is displayed on the console section 207, and includes at least an ON button 1001, an OFF button 1002, and an OK button 1006. The ON button 1001 is a button for setting execution of login processing for identifying a user. The OFF button 1002 is a button for setting non-execution of the login processing. In a case where the OFF button 1002 is selected, all users are allowed to use each function of the MFP 102 without performing the login operation. When the ON button 1001 is selected on the setting screen 1000, a menu 1003 is displayed on the setting screen 1000. A login method can be set on the menu 1003. In the present embodiment, as the login method, one of simple login and login using keyboard authentication (hereinafter referred to as the "keyboard login") is set.

The simple login is a login method which does not require a user to input a password when the user logs in to the MFP 102. In a case where "ON" is selected in a setting field 1004, the simple login is available in the MFP 102. In the simple login, for example, when the user A selects a user button 1101 (icon) associated with the user A on a login screen 1100, shown in FIG. 11, displayed on the console section 207, the user A is enabled to log in to the MFP 102. When the user button 1101 is selected, the MFP 102 acquires user identification information associated with the user button 1101 (first acquisition unit), and allows the user who has selected the user button 1101 to log into the MFP 102 as the "user A" based on the acquired user identification information. Note that the log-in screen 1100 also displays a guest button 1104 for allowing a user not registered in advance to log in as a guest.

Figure 12:
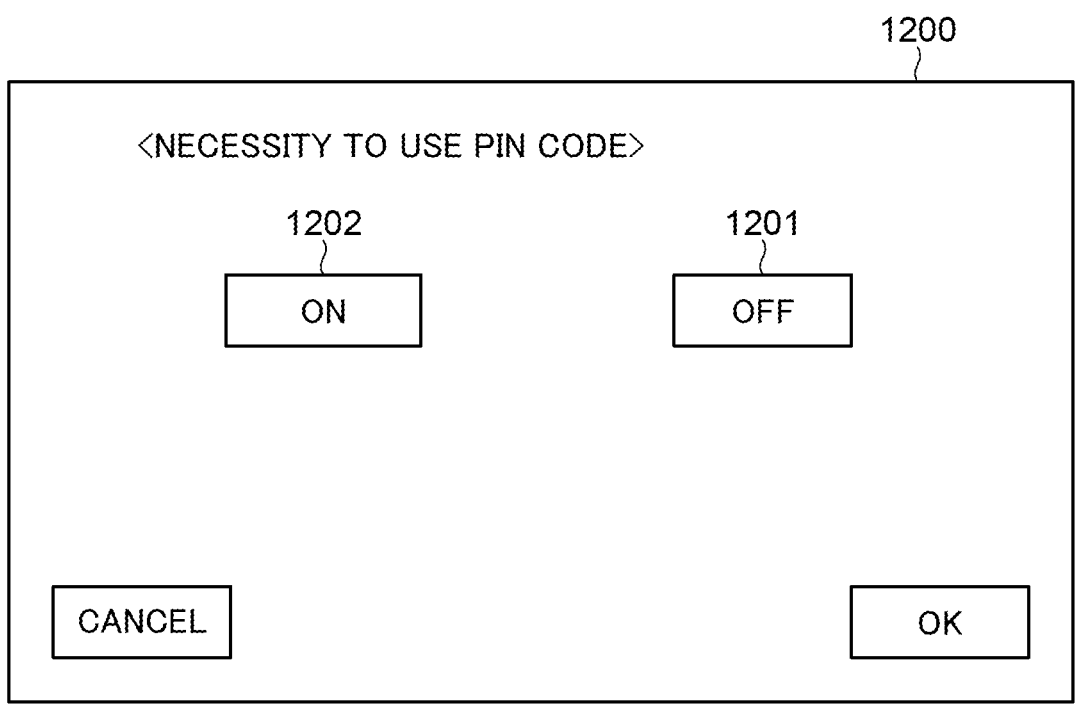
FIG. 12 is a diagram showing an example of a PIN code-setting screen displayed on the console section appearing in FIG. 2.
Figure 13:
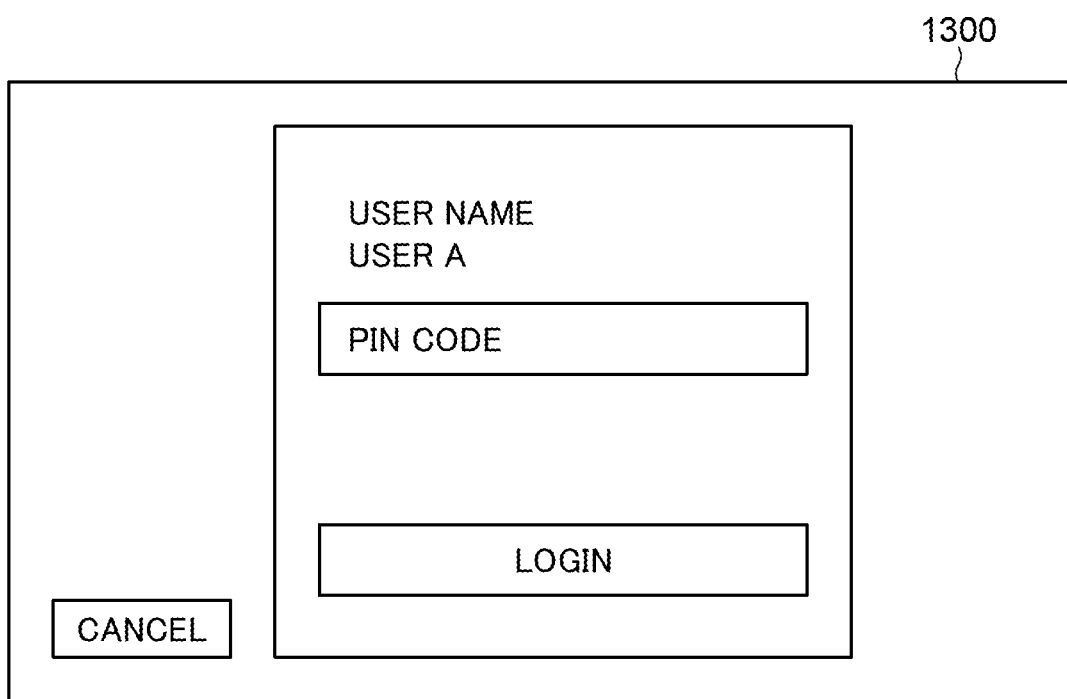
FIG. 13 is a diagram showing an example of a PIN code-inputting screen displayed on the console section appearing in FIG. 2.
Figure 14:
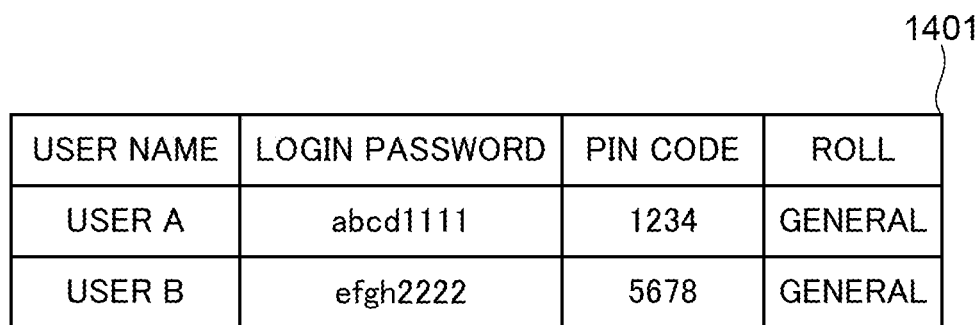
FIG. 14 is a diagram showing an example of an authentication information management table stored in the HDD appearing in FIG. 2.

Further, in the simple login, whether or not to require a user to input a PIN code associated with the user button 1101 or a user button 1102 (associated with a user B) when the user button 1101 or 1102 is selected on the login screen 1100 can be set on a PIN code-setting screen 1200 shown in FIG. 12. The PIN code-setting screen 1200 is displayed on the console section 207 when "ON" is selected in the setting field 1004 on the setting screen 1000. In a case where an "OFF" button 1201 is selected on the PIN code-setting screen 1200, the setting of not requiring the user to input a PIN code when the user button is selected on the login screen 1100 is set. On the other hand, in a case where an "ON" button 1202 is selected on the PIN code-setting screen 1200, the setting of requiring the user to input a PIN code when the user button is selected on the login screen 1100 is set. In the simple login, only PIN codes which are different from each other can be registered for user buttons, respectively. For example, in a case where the user button 1101 with which a PIN code has been registered in association is selected by the user A on the login screen 1100, a PIN code-inputting screen 1300 shown in FIG. 13 is displayed on the console section 207. If a PIN code input by the user A on the PIN code-inputting screen 1300 and the PIN code registered in association with the user button 1101 in advance match, the user A is allowed to log in to the MFP 102 as the "user A". The PIN code registered in association with the user button 1101 is managed in an authentication information management table 1401 shown in FIG. 14, which is stored in the HDD 205. The authentication information management table 1401 manages not only the PIN code, but also information indicative of a login password of each user and authority of each user in the MFP 102. In the present embodiment, the login password is formed by an eight-digit character string including both of alphabets and numbers. On the other hand, the PIN code is more simply formed than the login password, more specifically, formed by a four-digit number alone.

Figure 15:
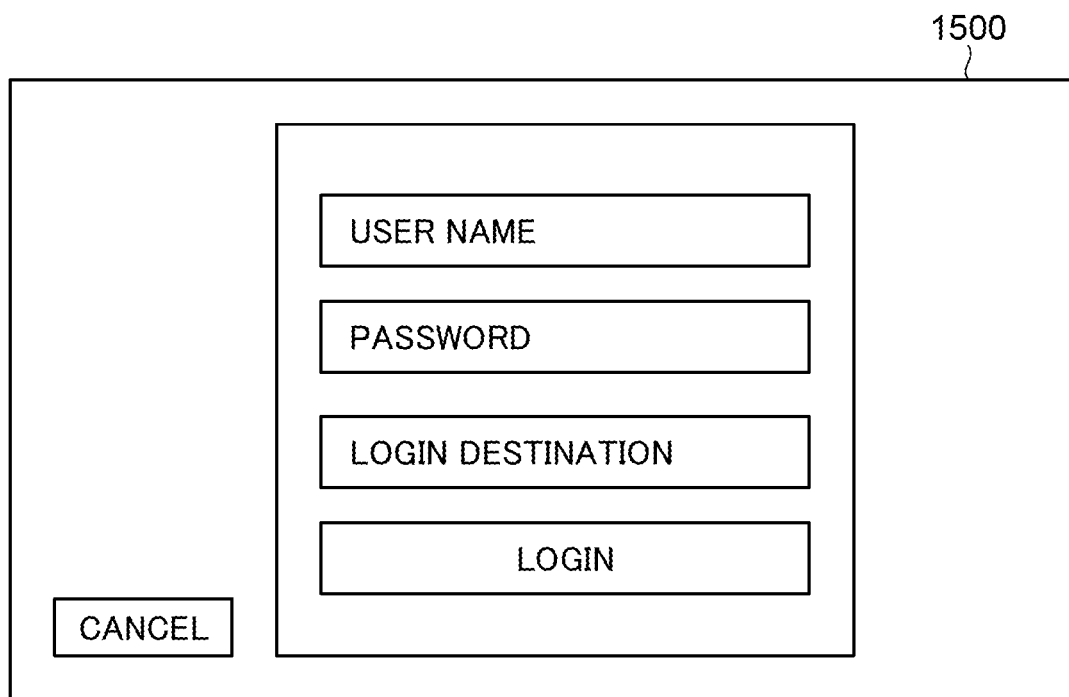
FIG. 15 is a diagram showing an example of a user information-inputting screen displayed on the console section appearing in FIG. 2.

The keyboard login is a login method which requires a user to input a password when logging in to the MFP 102. In a case where "ON" is selected on a setting field 1005 in FIG. 10, the keyboard login is available in the MFP 102. In the keyboard login, for example, when a user selects a keyboard authentication button 1103 on the login screen 1100 in FIG. 11 displayed on the console section 207, a user information-inputting screen 1500 shown in FIG. 15 is displayed on the console section 207. The MFP 102 acquires user information, such as a user name and a login password, input by the user on the user information-inputting screen 1500 (second acquisition unit), and performs user authentication using the acquired user information. If the user authentication is successful, the MFP 102 allows the user to log in to the MFP 102.

Referring again to FIG. 10, when the OK button 1006 is selected on the setting screen 1000, settings made on the setting screen 1000 are stored in the HDD 205. Note that in the present embodiment, settings commonly used for all users may be made on the setting screen 1000, or different settings may be made on a user-by-user basis.

Figure 16:
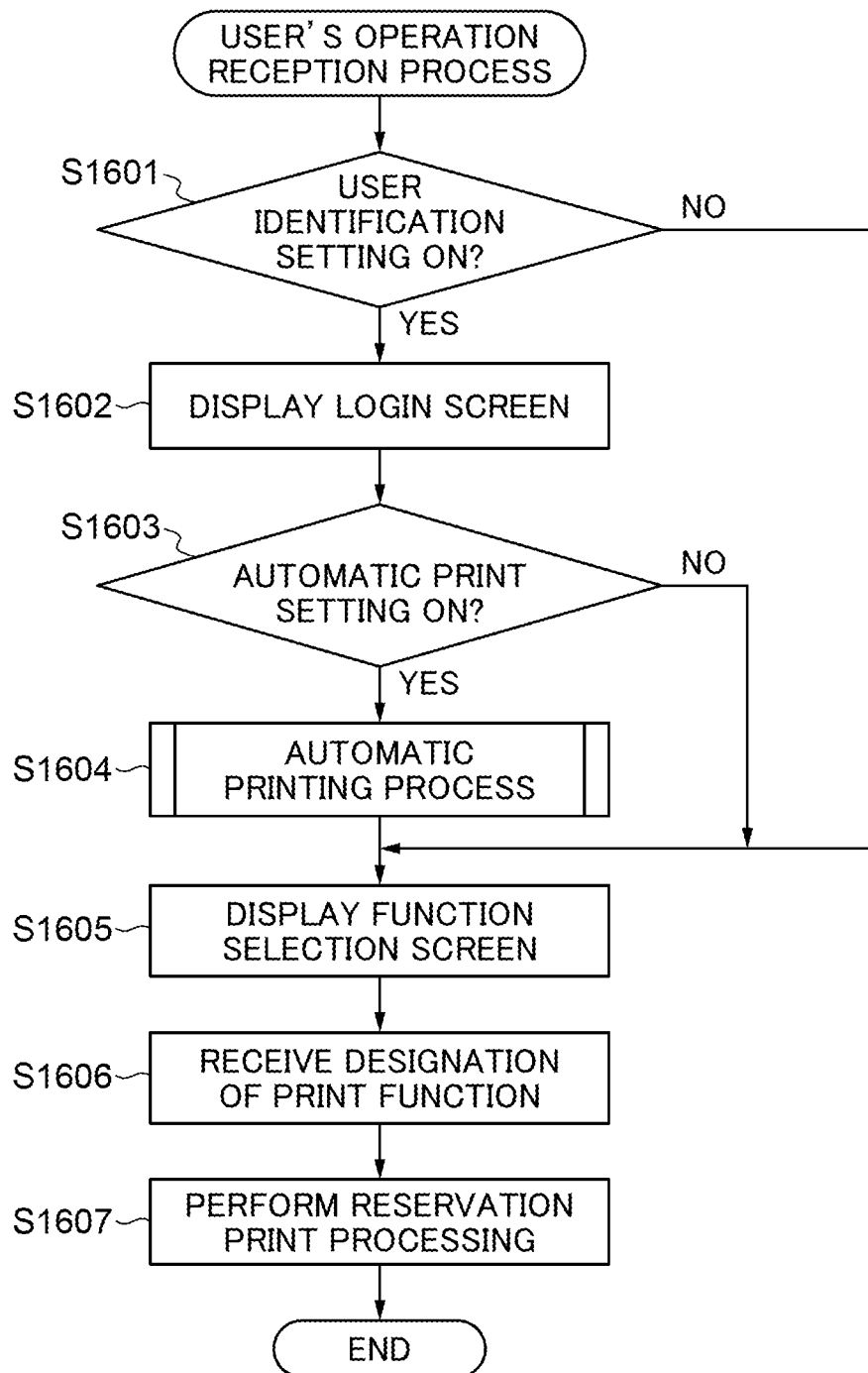
FIG. 16 is a flowchart of a user's operation reception process performed in a step in FIG. 6.

FIG. 16 is a flowchart of the user's operation reception process performed in the step S603 in FIG. 6. The process in FIG. 16 is performed by the CPU 202 of the MFP 102 that executes associated programs stored in the ROM 204 and the HDD 205. Note that the process in FIG. 16 is performed assuming that the settings on the setting screen 1000 and the PIN code-setting screen 1200 have already been made.

Referring to FIG. 16, the CPU 202 determines whether or not the user identification setting is set to ON (step S1601). In the step S1601, in a case where a setting made by the ON button 1001 on the setting screen 1000 has been stored in the HDD 205, the CPU 202 determines that user identification setting is set to ON. On the other hand, in a case where a setting made by the OFF button 1002 on the setting screen 1000 has been stored in the HDD 205, the CPU 202 determines that user identification is not set to ON.

If it is determined in the step S1601 that the user identification setting is set to ON, the CPU 202 performs login screen display processing (step S1602). In the step S1602, the CPU 202 displays the login screen 1100 on the console section 207 to thereby prompt a user to select the keyboard authentication button 1103, or the user button 1101 or 1102, or the guest button 1104, to perform log-in processing. Then, the CPU 202 determines whether or not an automatic print setting is set to ON (step S1603). In the step S1603, in a case where the login-time automatic print function is enabled, the CPU 202 determines that the automatic print setting is set to ON. On the other hand, in a case where the login-time automatic print function is disabled, the CPU 202 determines that the automatic print setting is not set to ON.

If it is determined in the step S1603 that the automatic print setting is not set to ON, or if it is determined in the step S1601 that the user identification setting is not set to ON, the CPU 202 proceeds to a step S1605.

If it is determined in the step S1603 that the automatic print setting is set to ON, the CPU 202 performs an automatic printing process, described with reference to FIG. 17 (step S1604), and executes a print job to be automatically printed, which is associated with the user who has logged in to the MFP 102. Then, the CPU 202 displays a function selection screen (not shown) on the console section 207 (step S1605). The function selection screen is a screen for prompting the user to select between functions installed in the MFP 102, such as a print function, a scan function, and a FAX function. Then, upon receipt of designation of the print function from the user on the function selection screen (step S1606), the CPU 202 displays a list of print jobs which are reserved and can be printed, on the console section 207. Not that a print job which has been executed in the step S1604, out of print jobs associated with the user who has logged in to the MFP 102, is not included in the above-mentioned list of print jobs. Upon receipt of an instruction for executing a print job or print jobs selected from the print job list, the CPU 202 performs reservation print processing for the selected print job(s) (step S1607), followed by terminating the present process.

Here, assuming that the user A erroneously selects the user button 1102 on the login screen 1100, which is associated with the user B, and with which no PIN code has been registered in association, the user A logs in to the MFP 102 as the "user B". In this case, in the MFP 102, a problem is caused that a print job of the user B, which is not intended by the user A, is automatically executed by the login-time automatic printing function.

To prevent this, in the present embodiment, login-time automatic printing (automatic printing start processing) is not performed in a case where the login method of the MFP 102 is set to the simple login, and is performed in a case where the login method of the MFP 102 is set to the keyboard login.

Figure 17:
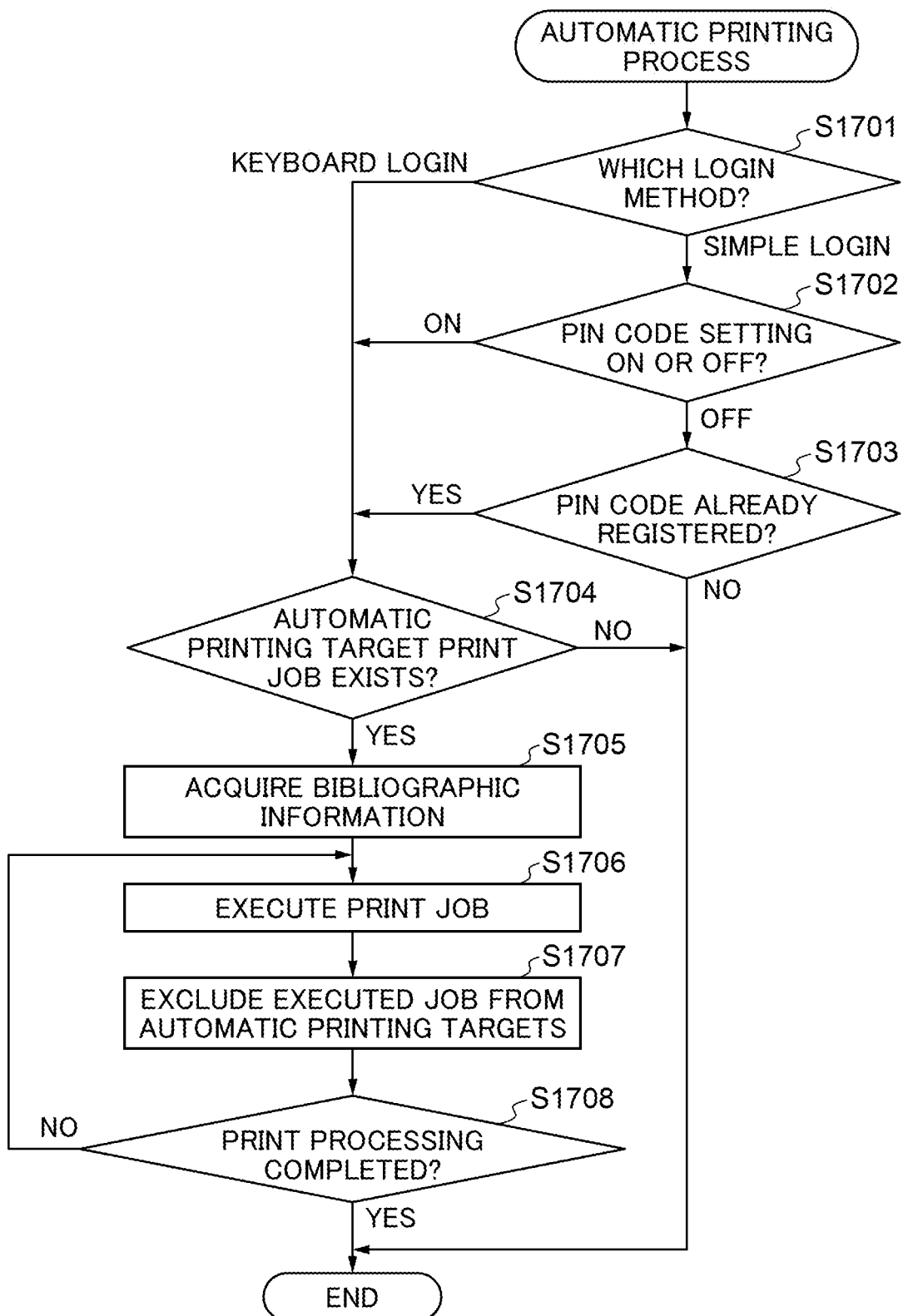
FIG. 17 is a flowchart of an automatic printing process performed in a step in FIG. 16.

FIG. 17 is a flowchart of the automatic printing process performed in the step S1604 in FIG. 16.

Referring to FIG. 17, the CPU 202 checks the login method used by the user (step S1701). More specifically, the CPU 202 determines whether the user has logged in to the MFP 102 by which method, the keyboard login or the simple login.

If it is determined in the step S1701 that the user has logged in by the simple login, the CPU 202 determines whether the PIN code setting is set to ON or OFF (step S1702). In the step S1702, in a case where a setting has been made by the OFF button 1201 on the PIN code-setting screen 1200, the CPU 202 determines that the PIN code setting is set to OFF. On the other hand, in a case where a setting has been made by the ON button 1202 on the PIN code-setting screen 1200, the CPU 202 determines that the PIN code setting is set to ON. In the present embodiment, in a case where the PIN code setting has been set to ON, the PIN code-inputting screen 1300 is displayed on the console section 207 according to selection of a user button on the login screen 1100. In this case, for example, even when the user A erroneously selects the user button 1102 associated with the user B, the MFP 102 does not immediately allow the user A to log in as the "user B". The MFP 102 performs user authentication using a PIN code input on the PIN code-inputting screen 1300, and performs authentication processing with respect to whether or not the user having selected the user button 1102 on the login screen 1100 is the user B associated with the user button 1102.

If it is determined in the step S1702 that the PIN code setting is set to OFF, the CPU 202 determines whether or not the PIN code of the selected user button has been registered in the authentication information management table 1401 (step S1703). In the present embodiment, in a case where a user button with which a PIN code has been registered in association is selected, the user is required to input the PIN code regardless of the setting made on the PIN code-setting screen 1200. In this case, the MFP 102 also performs user authentication using the input PIN code, and performs authentication processing with respect to whether or not a user having selected the user button on the login screen 1100 is a user associated with the selected user button.

If it is determined in the step S1703 that the PIN code of the selected user button has not been registered in the authentication information management table 1401, the CPU 202 terminates the present process without performing login-time automatic printing.

If it is determined in the step S1701 that the user has logged in using the keyboard login, if it is determined in the step S1702 that the PIN code setting is set to ON, or if it is determined in the step S1703 that the PIN code of the selected user button has been registered in the authentication information table 1401, the CPU 202 determines whether or not an automatic printing target print job, associated with the logged-in user, exists (step S1704). In the step S1704, in a case where any bibliographic information item having the automatic printing target 908 set to "o" is included in the bibliographic information of the logged-in user, which is registered in the bibliographic information management table 900, the CPU 202 determines that an automatic printing target print job, associated with the logged-in user, exists. On the other hand, in a case where no bibliographic information item having the automatic printing target 908 set to "o" is included in the bibliographic information of the logged-in user, which is registered in the bibliographic information management table 900, the CPU 202 determines that no automatic printing target print job associated with the logged-in user exists.

If it is determined in the step S1704 that no automatic printing target print job associated with the logged-in user exists, the CPU 202 terminates the present process. If it is determined in the step S1704 that an automatic printing target print job associated with the logged-in user exists, the CPU 202 acquires the bibliographic information items of all automatic printing target print jobs, which have been registered in the bibliographic information management table 900 and are also associated with the logged-in user (step S1705). Then, the CPU 202 sequentially executes the print jobs corresponding to the acquired bibliographic information items (step S1706) and excludes each executed print job from the automatic printing targets (step S1707). More specifically, the CPU 202 changes the mark in the automatic printing target 908 in the bibliographic information of the executed print job to "-" in the bibliographic information management table 900. Then, the CPU 202 determines whether or not print processing is completed for all the print jobs associated with the acquired bibliographic information items (step S1708).

If it is determined in the step S1708 that print processing is not completed for any of the print jobs associated with the acquired bibliographic information items, the CPU 202 returns to the step S1706. If it is determined in the step S1708 that print processing is completed for all the print jobs associated with the acquired bibliographic information items, the CPU 202 terminates the present process.

FIG. 18 is a table showing executability of login-time automatic printing for each login pattern in the MFP appearing in FIG. 1. Referring to FIG. 18, a case 1 corresponds to a case where it is determined in the step S1701 of the process in FIG. 17 that the user has logged in using the keyboard login. In the case 1, user authentication is performed using the user information input on the user information-inputting screen 1500, such as a user name and a login password, when the user logs in. By performing this user authentication, it is assured that the received login operation is not a user's erroneous operation, and hence in the case 1, login-time automatic printing is performed.

A case 2 corresponds to a case where it is determined in the step S1702 of the process in FIG. 17 that the PIN code setting is set to ON. Further, a case 3 corresponds to a case where it is determined in the step S1703 of the process in FIG. 17 that the PIN code of the selected user button has been registered in the authentication information management table 1401. In the cases 2 and 3, user authentication is performed using the PIN code input on the PIN code-inputting screen 1300 when the user logs in. By performing this user authentication, it is assured that the received login operation is not a user's erroneous operation, and hence in the cases 2 and 3, login-time automatic printing is performed.

A case 4 corresponds to a case where it is determined in the step S1703 of the process in FIG. 17 that the PIN code of the selected user button has not been registered in the authentication information management table 1401. Further, a case 5 corresponds to a case where the user has logged in using a login method which does not perform user authentication, such as login as a guest user. User authentication is performed in neither of the cases 4 and 5, and whether or not the received login operation is a user's erroneous operation is not sufficiently verified. Therefore, login-time automatic printing is not performed in the cases 4 and 5.

Figure 11:
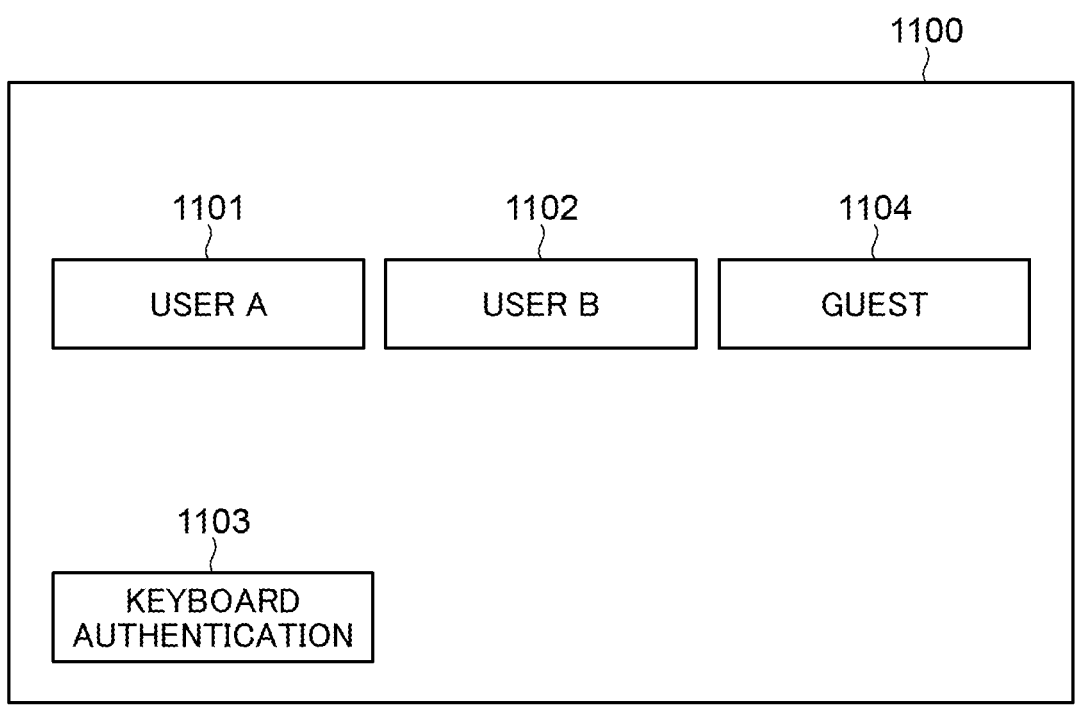
FIG. 11 is a diagram showing an example of a login screen displayed on the console section appearing in FIG. 2.
Figure 19:
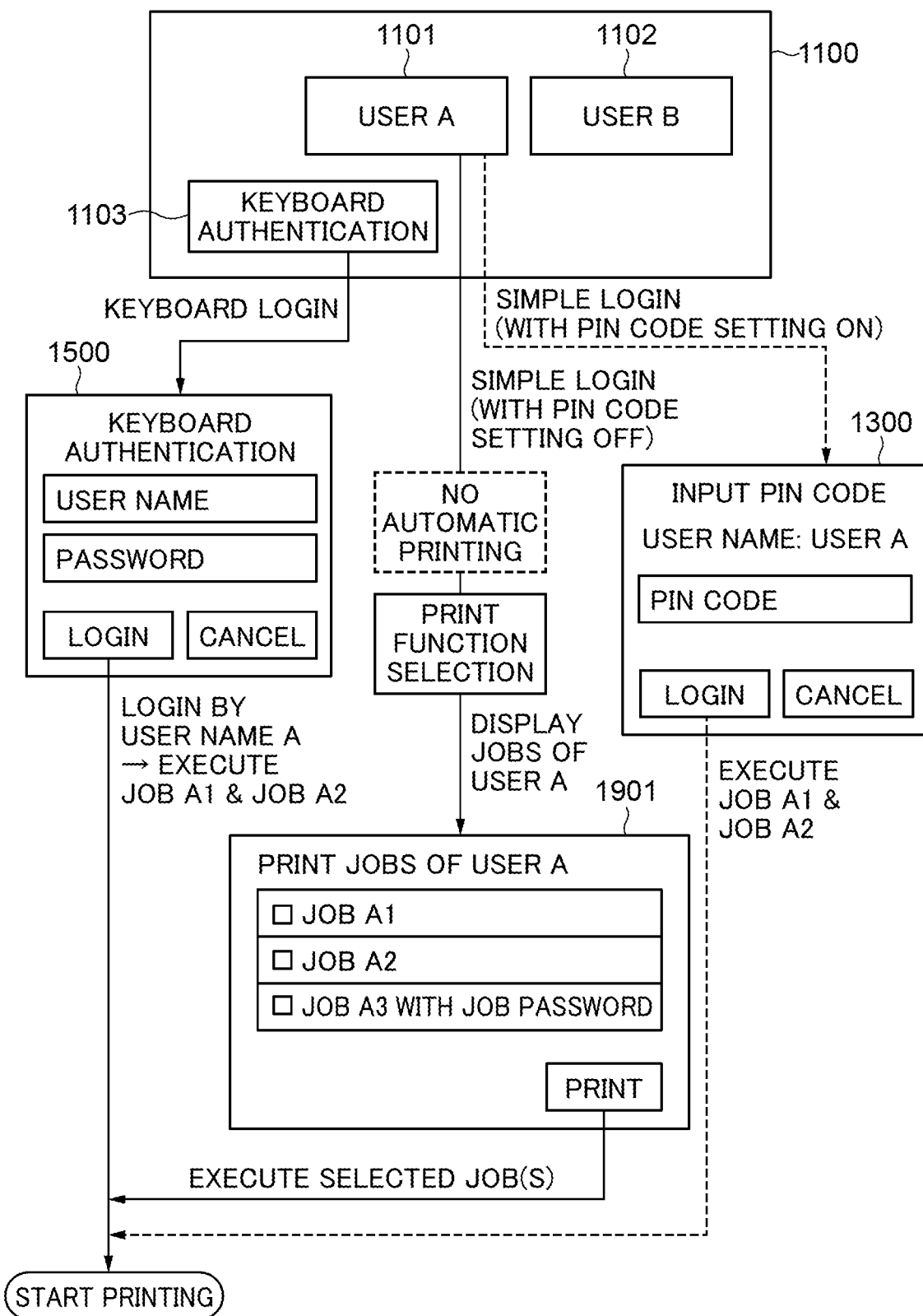
FIG. 19 is a diagram useful in explaining changes of screens on the console section in cases 1, 2, and 4 of the table shown in FIG. 18.

FIG. 19 is a diagram useful in explaining changes of screens on the console section in the cases 1, 2, and 4 on the table shown in FIG. 18. In the MFP 102, for example, in a case where both of the setting fields 1004 and 1005 are set to "ON" on the setting screen 1000, the login screen 1100 is displayed on the console section 207 as a screen for receiving a login operation performed by a user. Note that although in FIG. 19, the guest button 1104 is omitted from the login screen 1100 for ease of explanation, the guest button 1104 may be included in the login screen 1100 as illustrated in FIG. 11.

Figure 20A:
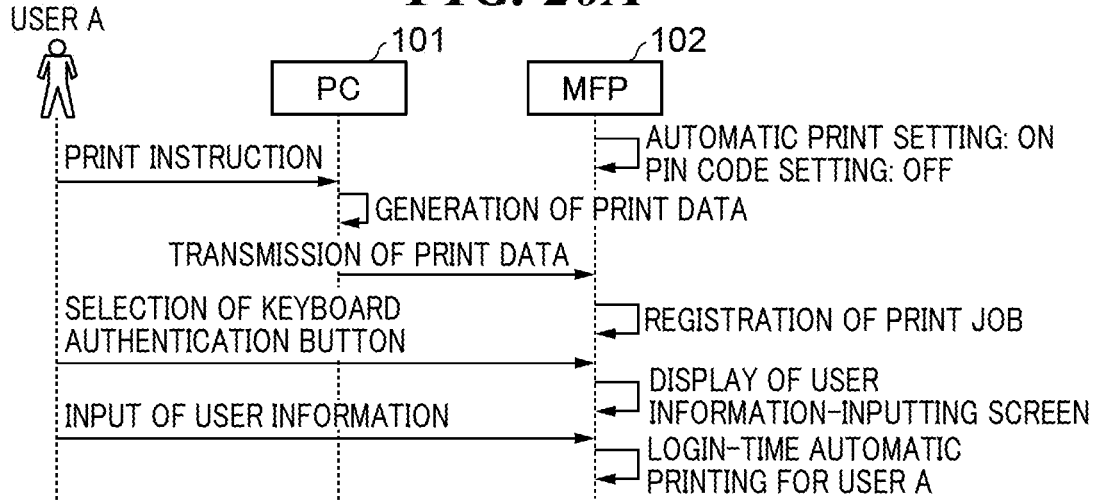
FIGS. 20A to 20C are sequence diagrams showing a processing flow from reception of a print instruction at the PC to start of printing at the MFP in the cases 1, 4, and 2 on the table shown in FIG. 18, respectively.

Referring to FIG. 19, as an example of the case 1, when the keyboard authentication button 1103 on the login screen 1100 is selected by the user A, the login screen 1100 is changed to the user information-inputting screen 1500 on the console section 207. Then, the user A inputs the user information, such as a user name and a login password, on the user information-inputting screen 1500, and when user authentication based on the input user information is successful, the MFP 102 performs login processing for allowing the user A to log in to the MFP 102. Then, the MFP 102 performs login-time automatic printing for the user A (see e.g. FIG. 20A). More specifically, the MFP 102 executes print jobs A1 and A2 as the automatic printing targets out of the print jobs A1 to A3 corresponding to the bibliographic information of the user A, registered in the bibliographic information table 900.

Figure 20B:
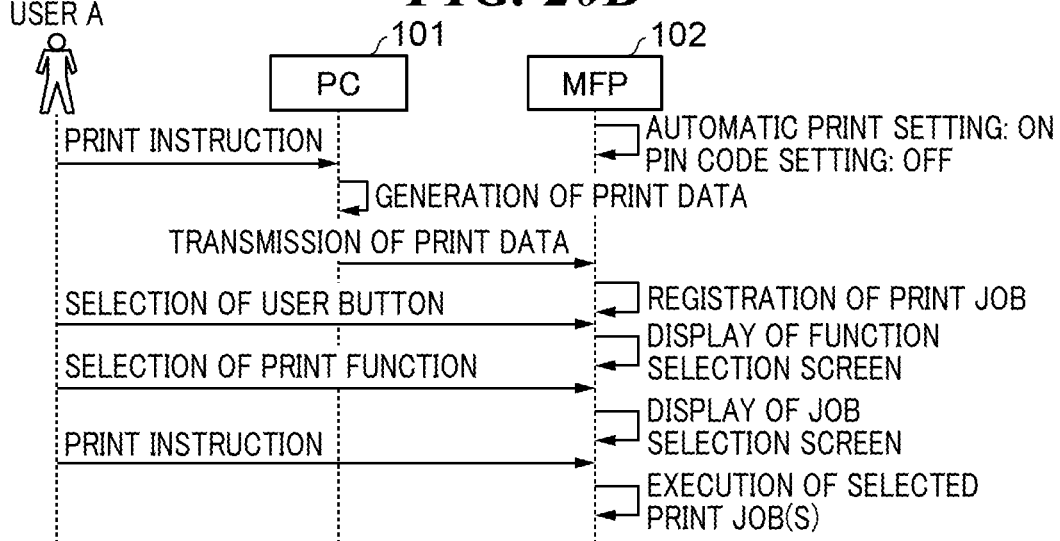

As an example of the case 4, when the user button 1101 on the login screen 1100 is selected by the user A in a state in which the PIN code setting is set to OFF, the login screen 1100 is changed to the function selection screen on the console section 207. Then, when the user A selects the print function on the function selection screen, the function selection screen is changed to a job selection screen 1901, appearing in FIG. 19, on the console section 207. The job selection screen 1901 is a screen for prompting a user to select a print job to be printed. The job selection screen 1901 displays the print jobs A1 to A3 associated with the bibliographic information items of the user A, which are registered in the bibliographic information table 900, as selectable items. When an instruction for executing a print job or print jobs selected out of the print jobs A1 to A3 is received on the job selection screen 1901, the MFP 102 executes the selected print job(s) (see e.g. FIG. 20B).

Figure 20C:
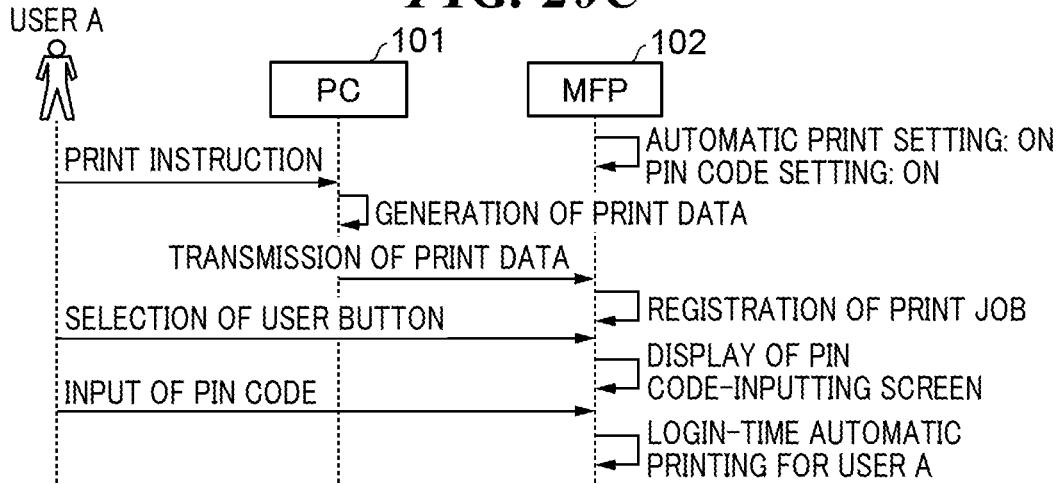

As an example of the case 2, when the user button 1101 on the login screen 1100 is selected by the user A in a state in which the PIN code setting is set to ON, the login screen 1100 is changed to the PIN code-inputting screen 1300 on the console section 207. Then, the user A inputs a PIN code on the PIN code-inputting screen 1300, and when user authentication based on the input PIN code is successful, the MFP 102 performs login processing for allowing the user A to log in to the MFP 102. Then, the MFP 102 performs login-time automatic printing for the user A (see e.g. FIG. 20C).

Figure 21:
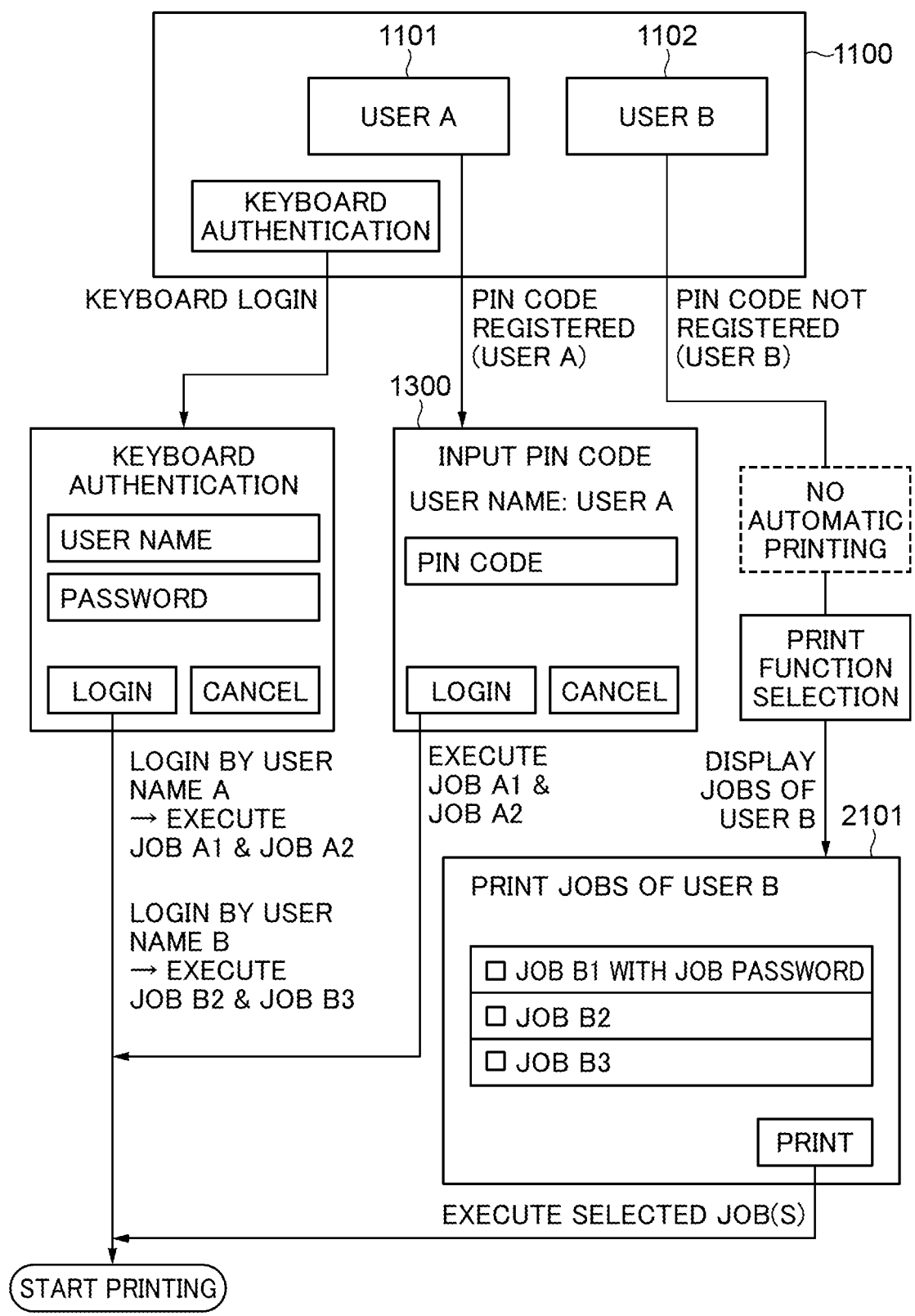
FIG. 21 is a diagram useful in explaining changes of screens on the console section in the cases 3 and 4 on the table shown in FIG. 18.

FIG. 21 is a diagram useful in explaining changes of screens on the console section in the cases 3 and 4 on the table shown in FIG. 18. Note that although in FIG. 21, the guest button 1104 is omitted from the login screen 1100 for ease of explanation, the guest button 1104 may be included in the login screen 1100.

Figure 22A:
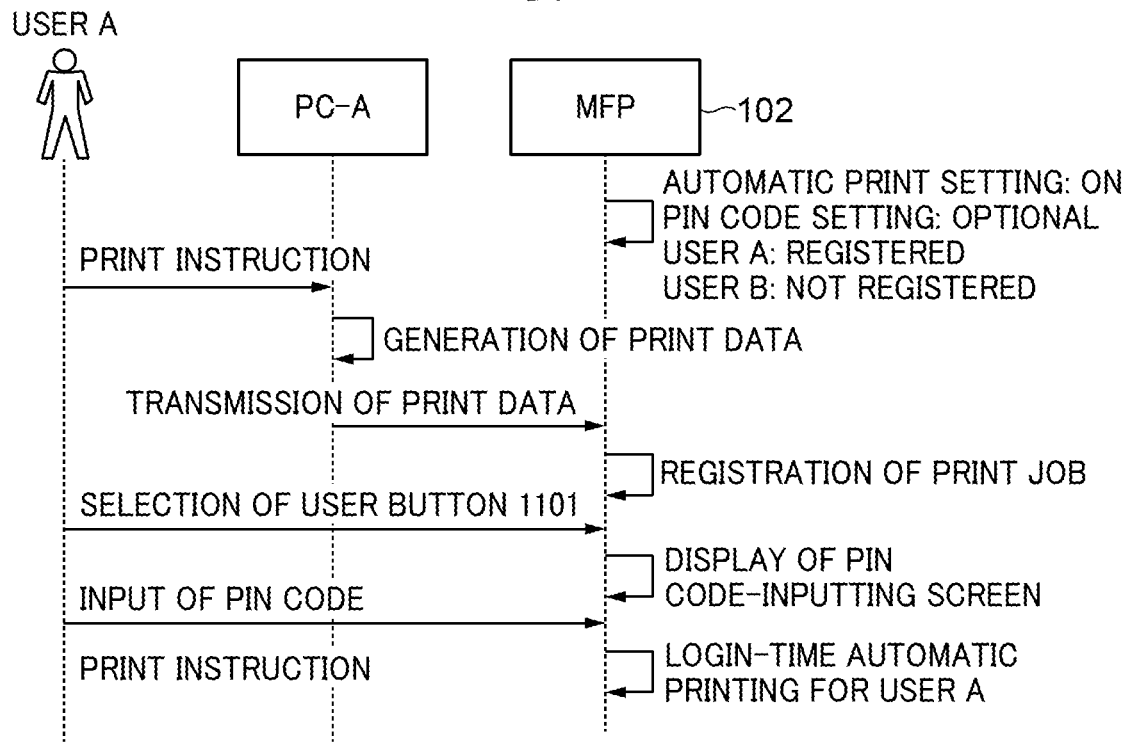
FIGS. 22A and 22B are sequence diagrams showing a processing flow from reception of a print instruction at the PC to start of printing at the MFP in the cases 3 and 4 on the table shown in FIG. 18, respectively.

As an example of the case 3, when the user button 1101 with which a PIN code has been registered in association is selected by the user A in a state in which the PIN code setting is set to OFF, the login screen 1100 is changed to the PIN code-inputting screen 1300 on the console section 207. Then, the user A inputs the PIN code on the PIN code-inputting screen 1300, and when user authentication based on the input PIN code is successful, the MFP 102 performs login processing for allowing the user A to log in to the MFP 102. Then, the MFP 102 performs login-time automatic printing for the user A (see e.g. FIG. 22A).

Figure 22B:
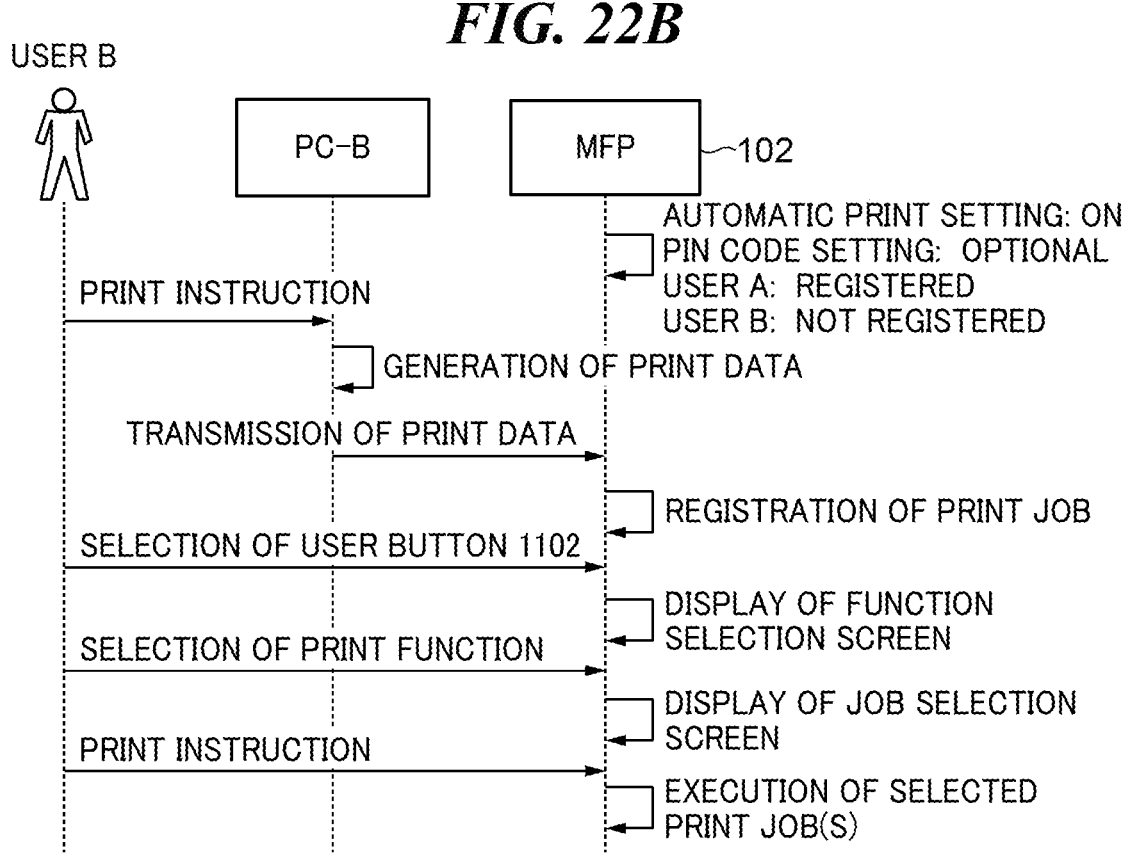

As an example of the case 4, when the user button 1102 with which no PIN code has been registered in association is selected by the user B in a state in which the PIN code setting is set to OFF, the login screen 1100 is changed to the function selection screen on the console section 207. Then, when the user B selects the print function on the function selection screen, the function selection screen is changed to a job selection screen 2101, appearing in FIG. 21, on the console section 207. The job selection screen 2101 is also a screen for prompting a user to select a print job to be printed. The job selection screen 2101 displays print jobs B1 to B3 associated with the bibliographic information items of the user B, which are registered in the bibliographic information table 900, as selectable items. When an instruction for executing a print job or print jobs selected out of the print jobs B1 to B3 is received on the job selection screen 2101, the MFP 102 executes the selected print job(s) (see e.g. FIG. 22B).

According to the above-described embodiment, in a case where the login method for logging in to the MFP 102 is the simple login which does not require execution of user authentication at login, login-time automatic printing is not performed, whereas in a case where the login method for logging in to the MFP 102 is the keyboard login which requires execution of user authentication at login, login-time automatic printing is performed. With this, it is possible to prevent execution of login-time automatic printing in a case where whether or not the received login operation is a user's erroneous operation is not sufficiently verified because user authentication is not performed at login. As a result, it is possible to prevent unintended print data from being automatically printed due to a user's erroneous operation in login-time automatic printing.

Further, in the above-described embodiment, in a case where a user button is selected in a state in which the PIN code setting is set to OFF, login-time automatic printing is not performed, whereas in a case where a user button is selected in a state in which the PIN code setting is set to ON, login-time automatic printing is performed. Further, in a case where a PIN code associated with a selected user button has not been registered, login-time automatic printing is not performed, whereas in a case where a PIN code associated with a selected user button has been registered, login-time automatic printing is performed. With this, it is possible to prevent execution of login-time automatic printing in a case where whether or not the received login operation is a user's erroneous operation is not sufficiently verified because user authentication is not performed at login. As a result, it is possible to prevent unintended print data from being automatically printed due to a user's erroneous operation in login-time automatic printing.

Although the present disclosure is described using the above-described embodiment, the present disclosure is not limited to the above-described embodiment. For example, in a case where a user button with which a print job as an automatic printing target is associated is selected on the login screen 1100, a confirmation screen 2300 appearing in FIG. 23 may be displayed on the console section 207. The confirmation screen 2300 includes a message for confirming a user that the user is the user associated with the user button selected on the login screen 1100.

Figure 23:
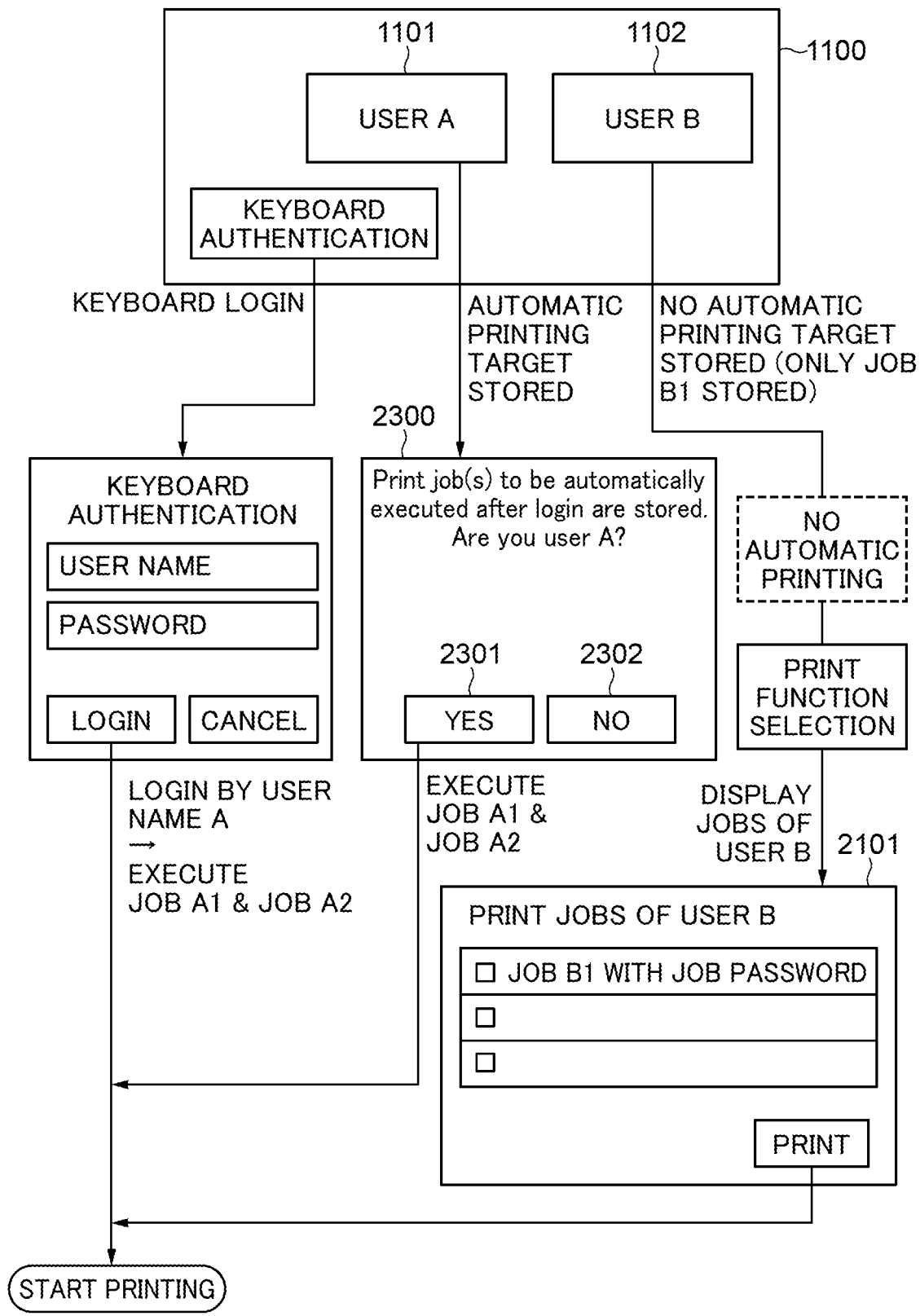
FIG. 23 is a diagram useful in explaining changes of screens on the console section in a case where a predetermined condition is satisfied.

For example, as shown in FIG. 23, in a case where the user button 1101 with which a print job as an automatic printing target is associated is selected by the user A on the login screen 1100, the login screen 1100 is changed to the confirmation screen 2300 on the console section 207. If a Yes button 2301 is selected, the MFP 102 executes the print jobs A1 and A2 as the automatic printing targets, associated with the selected user button 1101 (see e.g. FIG. 24A). On the other hand, a No button 2302 is selected, the MFP 102 does not execute the print jobs A1 and A2 as the automatic printing targets, associated with the selected user button 1101. With this, it is possible to prevent unintended print data from being automatically printed in a case where whether or not the received login operation is a user's erroneous operation is not sufficiently verified, and further, it is possible to provide a mechanism that makes it possible to receive a print instruction with a relatively simple operation.

On the other hand, as shown in FIG. 23, in a case where the user button 1102 with which a print job as an automatic printing target is not associated is selected by the user B on the login screen 1100, the login screen 1100 is changed to the function selection screen on the console section 207. Then, when the user B selects the print function on the function selection screen, the function selection screen is changed to the job selection screen 2101 on the console section 207. The job selection screen 2101 displays the print jobs associated with the bibliographic information items of the user B, which are registered in the bibliographic information table 900, as selectable items. When an instruction for executing a print job or print jobs which is/are selected is received on the job selection screen 2101, the MFP 102 executes the selected print job(s) (see e.g. FIG. 24B).

Further, in the above-described embodiment, in a case where login-time automatic printing is not performed because the simple login is set for the MFP 102 as the login method, for example, a notification screen for prompting a user to change the login method from the simple login to the keyboard login may be displayed on the console section 207. With this, it is possible to notify the user of a login method which does not prevent the user from making use of the login-time automatic print function.

Further, although in the above-described embodiment, the description is given of the case where keyboard authentication is performed as a method of login in a user authenticated state, the method of login used in the user authenticated state is not limited to the keyboard authentication. For example, a login method which can acquire user credential information necessary for user authentication, such as login using an IC card, login using fingerprint authentication, login using iris authentication, and login using short distance wireless communication, may be used. Further, there may be employed a login method in which a user is authenticated by performing face authentication or voice authentication, or by holding a mobile terminal or security token device owned by the user close to the MFP to thereby acquire user credential information for authentication, and the user who is successfully authenticated is allowed to log in. Further, in a case where biological information or a device owned by a user is used as user credential information, it is also possible to perform user authentication by using a plurality of credential information items in combination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-112113 filed Jun. 12, 2018, which is hereby incorporated by reference herein in its entirety.

What is claimed is:

1. An image forming apparatus comprising:
   a printer;
   one or more memories configured to store instructions, wherein a setting indicating whether an input of user authentication information for user authentication is required is stored in the one or more memories; and
   one or more processors configured to execute the instructions to:
   receive a print job from an external apparatus;
   store the received print job in association with a user in a storage device;
   perform a first log-in processing which uses user authentication information inputted by a user:
   perform, according to a selection of a user object which is registered in association with user information, a second log-in processing which uses user information associated with the user object without a user input of user authentication information;
   in a case where the setting indicates that an input of user authentication information for user authentication is required, control the printer to perform, without receiving a print instruction, at least one print job stored in association with the user when the first log-in processing is performed; and
   in a case where the setting indicates that an input of user authentication information for user authentication is not required, control the printer not to perform, without receiving a print instruction, at least one print job stored in association with the user when the second log-in processing is performed.

2. The image forming apparatus according to claim 1, wherein, in a case where the setting indicates that an input of a password for user authentication is not required, the one or more processors further execute the instructions to control the printer to perform, based on receiving a print instruction, at least one print job stored in association with the authenticated user when the second log-in processing is performed.

3. The image forming apparatus according to claim 1,
   wherein a second setting indicating whether to perform, without receiving a print instruction, at least one print job stored in association with the authenticated user is stored in the one or more memories, and
   wherein, in a case where the setting indicates that an input of a password for user authentication is required and the second setting indicates to perform, without receiving a print instruction, at least one print job stored in association with the authenticated user, the one or more processors further execute the instructions to control the printer to perform, without receiving a print instruction, at least one print job stored in association with the authenticated user when the first log-in processing is performed.

4. The image forming apparatus according to claim 3,
   wherein, in a case where the second setting indicates not to perform, without receiving a print instruction, at least one print job stored in association with the authenticated user and the user has been authenticated, the one or more processors further execute the instructions to control the printer to perform, based on receiving a print instruction, at least one print job stored in association with the authenticated user when the first log-in processing or the second log-in processing is performed.

5. The image forming apparatus according to claim 1, wherein the first log-in processing is performed in a case where the user object is selected by a user and the user authentication information is inputted by the user.

6. The image forming apparatus according to claim 1, wherein, in the case where the setting indicates that the input of user authentication information for user authentication is not required, the printer is forbidden to perform, without receiving the print instruction, at least one print job stored in association with the user when the second log-in processing is performed.

7. The image forming apparatus according to claim 4, wherein, in the case where the setting indicates that the input of user authentication information for user authentication is not required and the second setting indicates to perform, without receiving the print instruction, at least one print job stored in association with the authenticated user, the printer is forbidden to perform, without receiving the print instruction, at least one print job stored in association with the user when the second log-in processing is performed in spite of the second setting.

8. The image forming apparatus according to claim 1, wherein the print instruction is received from the user on an operation device of the image forming apparatus.

9. A control method for an image forming apparatus comprising a printer and one or more memories configured to store instructions, wherein a setting indicating whether an input of user authentication information for user authentication is required is stored in the one or more memories, the control method comprising:

receiving a print job from an external apparatus;
storing the received print job in association with a user in a storage device;
performing a first log-in processing which uses user authentication information inputted by a user;
performing, according to a selection of a user object which is registered in association with user information, a second log-in processing which uses user information associated with the user object without a user input of user authentication information;
in a case where the setting indicates that an input of user authentication information for user authentication is required, controlling the printer to perform, without receiving a print instruction, at least one print job stored in association with the user when the first log-in processing is performed; and
in a case where the setting indicates that an input of user authentication information for user authentication is not required, controlling the printer not to perform, without receiving a print instruction, at least one print job stored in association with the user when the second log-in processing is performed.

10. A non-transitory computer readable storage medium on which is stored a computer executable program for executing a control method for an image forming apparatus comprising a printer and one or more memories storing configured to store instructions, wherein a setting indicating whether an input of user authentication information for user authentication is required is stored in the one or more memories, the control method comprising:

receiving a print job from an external apparatus;
storing the received print job in association with a user in a storage device;
performing a first log-in processing which uses user authentication information inputted by a user;
performing, according to a selection of a user object which is registered in association with user information, a second log-in processing which uses user information associated with the user object without a user input of user authentication information;
in a case where the setting indicates that an input of user authentication information for user authentication is required, controlling the printer to perform, without receiving a print instruction, at least one print job stored in association with the user when the first log-in processing is performed; and
in a case where the setting indicates that an input of user authentication information for user authentication is not required, controlling the printer not to perform, without receiving a print instruction, at least one print job stored in association with the user when the second log-in processing is performed.

11. An image forming apparatus comprising:
a printer;
one or more memories configured to store instructions, wherein a setting indicating whether an input of user authentication information for user authentication is required is stored in the one or more memories; and
one or more processors configured to execute the instructions to:
receive a print job from an external apparatus;
store the received print job in association with a user in a storage device;
perform a first log-in processing which uses user authentication information inputted by a user;
perform, according to a selection of a user object which is registered in association with user information, a second log-in processing which uses user information associated with the user object without a user input of user authentication information;
in a case where the setting indicates that an input of user authentication information for user authentication is required, control the printer to perform, without receiving a print instruction, at least one print job stored in association with the user when the first log-in processing is performed; and
in a case where the setting indicates that an input of user authentication information for user authentication is not required, control the printer to perform, according to a print instruction, at least one print job stored in association with the user when the second log-in processing is performed.

12. The image forming apparatus according to claim 11, wherein the user authentication information inputted by the user is a password for user authentication.

13. The image forming apparatus according to claim 11, wherein the user authentication information inputted by the user is a password and a user identification information for user authentication.

14. The image forming apparatus according to claim 11, wherein the at least one print job performed according to the print instruction is at least one print job with a job-password.

* * * * *